US012651115B2

(12) United States Patent
Sen et al.

(10) Patent No.: US 12,651,115 B2
(45) Date of Patent: Jun. 9, 2026

(54) SYSTEMS AND METHODS FOR USING LARGE LANGUAGE MODEL(S) TO WRITE, EDIT, AND REWRITE COHERENT CONTENT ITEMS

(71) Applicant: Ema Unlimited Inc., Mountain View, CA (US)

(72) Inventors: Souvik Sen, Sunnyvale, CA (US); Surojit Chatterjee, Los Altos Hills, CA (US)

(73) Assignee: EMA UNLIMITED, INC.

( * ) Notice: Subject to any disclaimer, the term of this patent is extended or adjusted under 35 U.S.C. 154(b) by 120 days.

(21) Appl. No.: 18/675,403

(22) Filed: May 28, 2024

(65) Prior Publication Data

US 2025/0363295 A1 Nov. 27, 2025

Related U.S. Application Data

(63) Continuation-in-part of application No. 18/672,005, filed on May 23, 2024.

(51) Int. Cl.
| | |
|---|---|
| *G06F 40/56* | (2020.01) |
| *G06F 16/31* | (2019.01) |
| *G06F 16/334* | (2025.01) |
| *G06F 16/355* | (2025.01) |
| *G06F 40/186* | (2020.01) |

(52) U.S. Cl.
CPC .......... *G06F 40/186* (2020.01); *G06F 16/316* (2019.01); *G06F 16/3344* (2019.01); *G06F 16/355* (2019.01)

(58) Field of Classification Search
None
See application file for complete search history.

(56) References Cited

U.S. PATENT DOCUMENTS

| | | | | |
|---|---|---|---|---|
| 12,299,404 | B2 * | 5/2025 | Aberle | G06N 3/0475 |
| 2023/0274086 | A1 * | 8/2023 | Tunstall-Pedoe | G06F 40/20 |
| | | | | 704/9 |
| 2023/0315772 | A1 * | 10/2023 | Pendar | G06F 16/338 |
| | | | | 707/727 |
| 2024/0220735 | A1 * | 7/2024 | Gray | G06F 40/56 |
| 2024/0354436 | A1 * | 10/2024 | Mukherjee | G06F 16/3344 |
| 2024/0428005 | A1 * | 12/2024 | Abraham | G06F 16/38 |
| 2025/0053738 | A1 * | 2/2025 | Dingler | G10L 13/08 |
| 2025/0077558 | A1 * | 3/2025 | Zhang | G06F 40/205 |
| 2025/0147993 | A1 * | 5/2025 | Chen | G06F 16/9024 |
| 2025/0173365 | A1 * | 5/2025 | Sivulka | G06F 16/221 |
| 2025/0307286 | A1 * | 10/2025 | Hurst | G06F 16/3338 |

* cited by examiner

*Primary Examiner* — Seong-Ah A Shin

(57) ABSTRACT

Systems and methods for using large language models (LLM) to generate and edit content items are described. The methods generate a template of a content item based on user input and populate the template based on data obtained from querying an LLM-generated semantic graph that includes data sources to which a user has authorized access. Once generated, one or more sources provided are used for editing the identified text of the generated content item. If multiple sources are provided, they are weighted based on factors and their priority is determined. Raw data from the provided source(s) are indexed. An LLM using the identified text as an input, queries the index to identify data relevant for editing the identified text. The relevant data is then used to edit, rewrite and/or regenerate the identified text and make the unedited text in the content item coherent with the edited text.

20 Claims, 25 Drawing Sheets

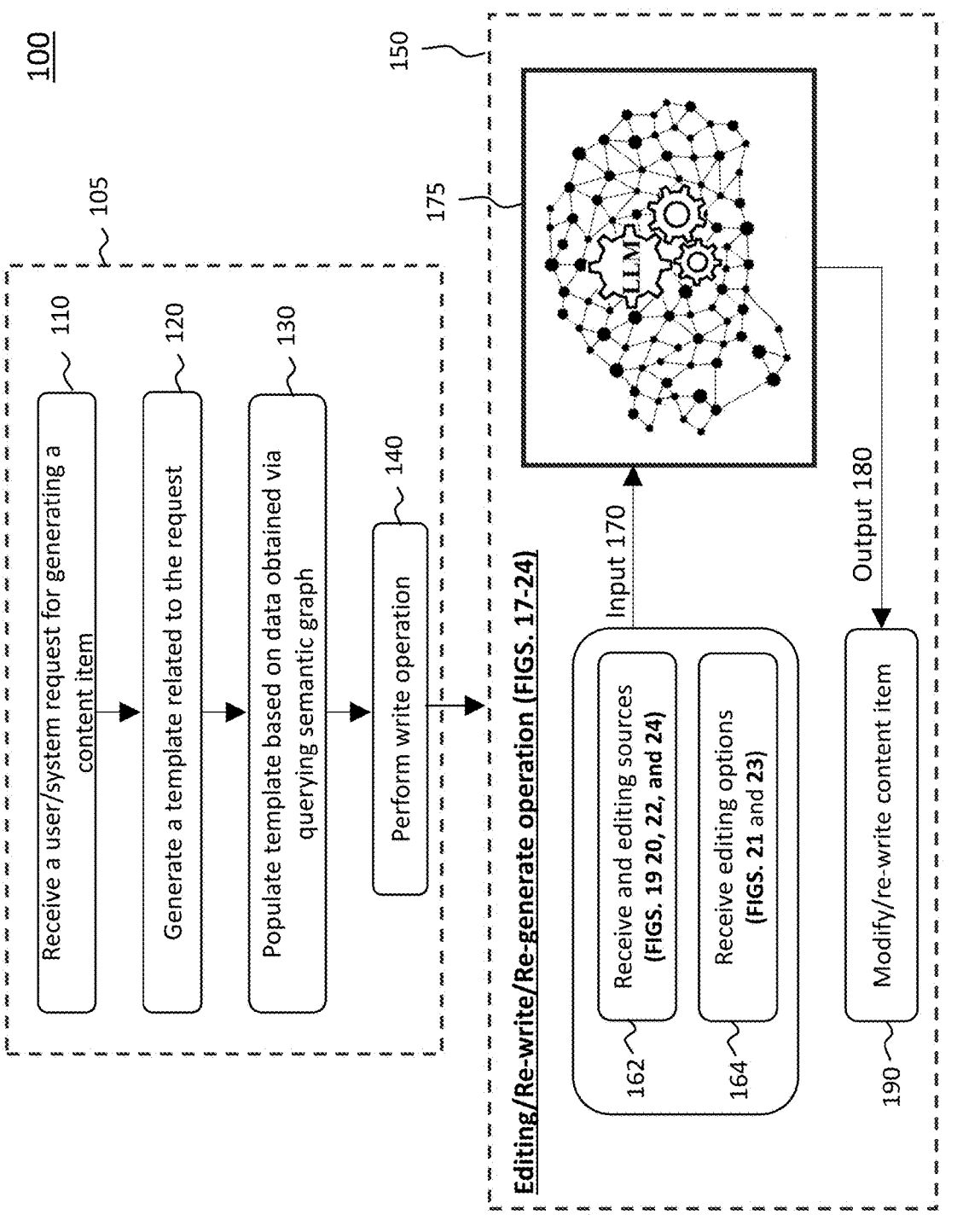

100

105

Receive a user/system request for generating a content item — 110

Generate a template related to the request — 120

Populate template based on data obtained via querying semantic graph — 130

Perform write operation — 140

Editing/Re-write/Re-generate operation (FIGS. 17-24) — 150

175

Input 170

Receive and editing sources (FIGS. 19 20, 22, and 24) — 162

Receive editing options (FIGS. 21 and 23) — 164

Output 180

Modify/re-write content item — 190

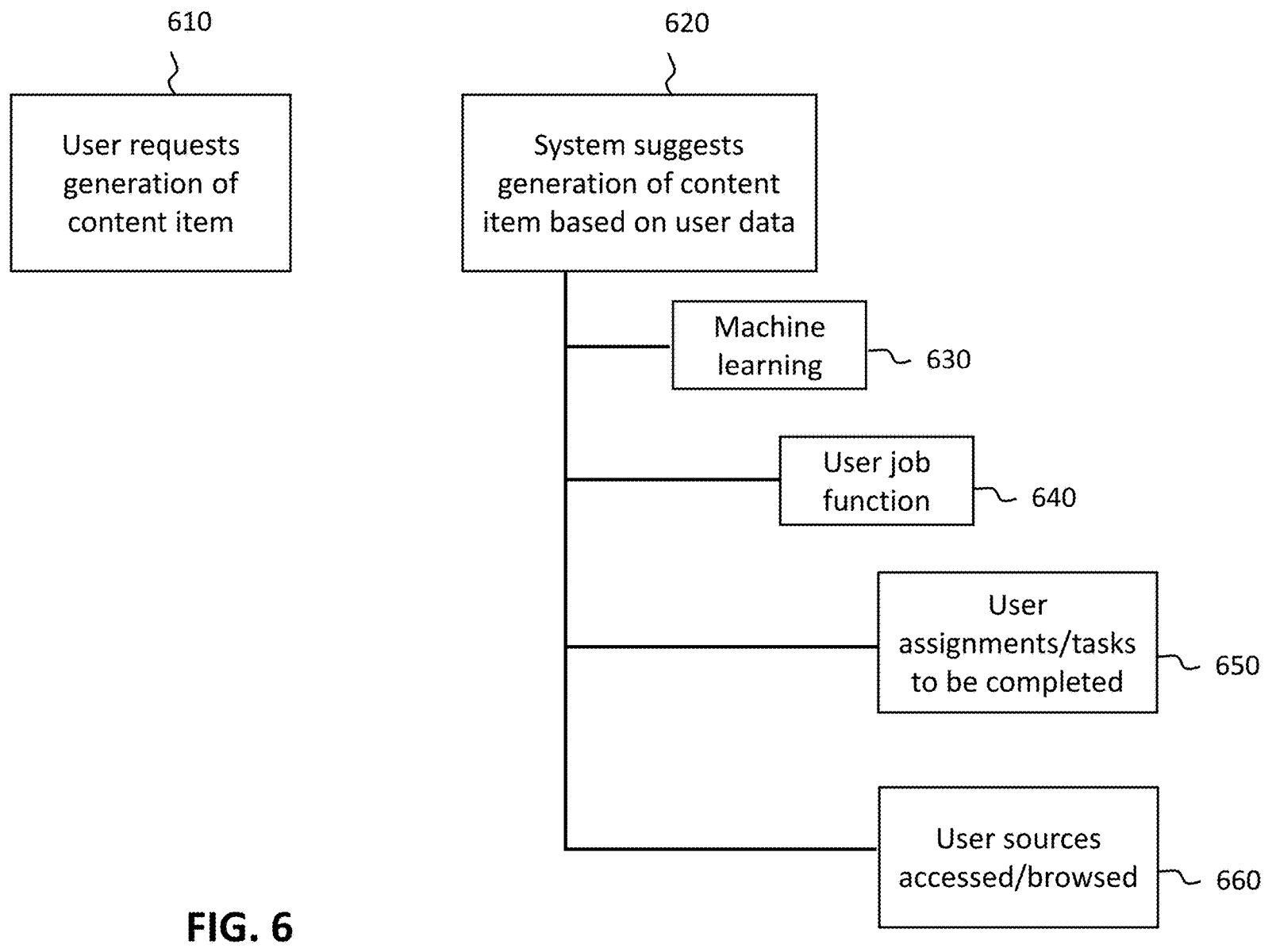

User requests
generation of
content item

620

System suggests
generation of content
item based on user data

630

Machine
learning

640

User job
function

650

User
assignments/tasks
to be completed

660

User sources
accessed/browsed

FIG. 6

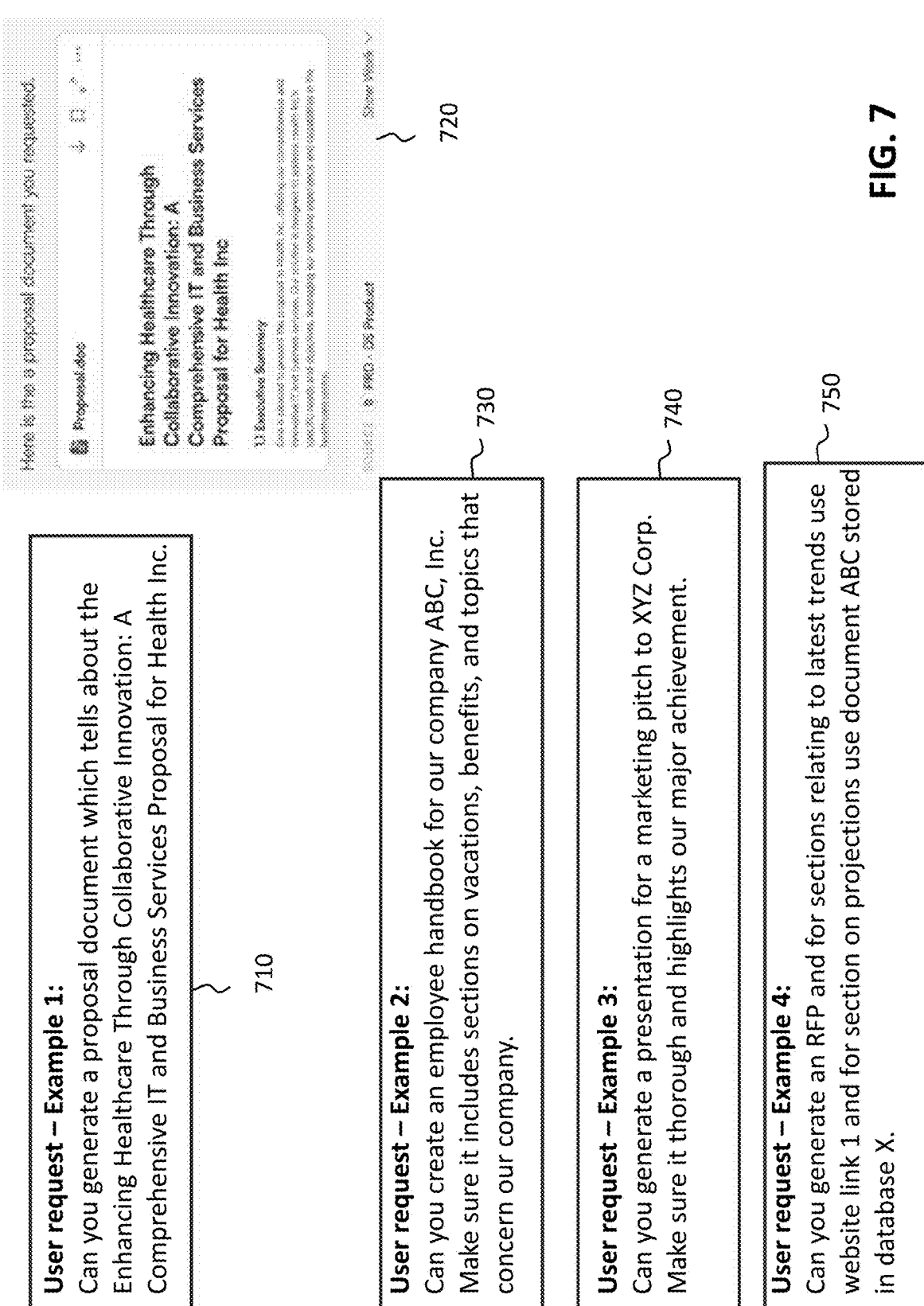

User request – Example 1:

Can you generate a proposal document which tells about the Enhancing Healthcare Through Collaborative Innovation: A Comprehensive IT and Business Services Proposal for Health Inc.

710

User request – Example 2:

Can you create an employee handbook for our company ABC, Inc. Make sure it includes sections on vacations, benefits, and topics that concern our company.

730

User request – Example 3:

Can you generate a presentation for a marketing pitch to XYZ Corp. Make sure it thorough and highlights our major achievement.

740

User request – Example 4:

Can you generate an RFP and for sections relating to latest trends use website link 1 and for section on projections use document ABC stored in database X.

Verification Module

850

Final Template

860

840

Template Generator

- Table of contents
- Main heading 1
- Sub heading 1
- 2nd layer subheading 1

- Main heading n
- Sub heading n

830

User Interface

810

Automatic Machine Generation

820

Description

Figure 11:
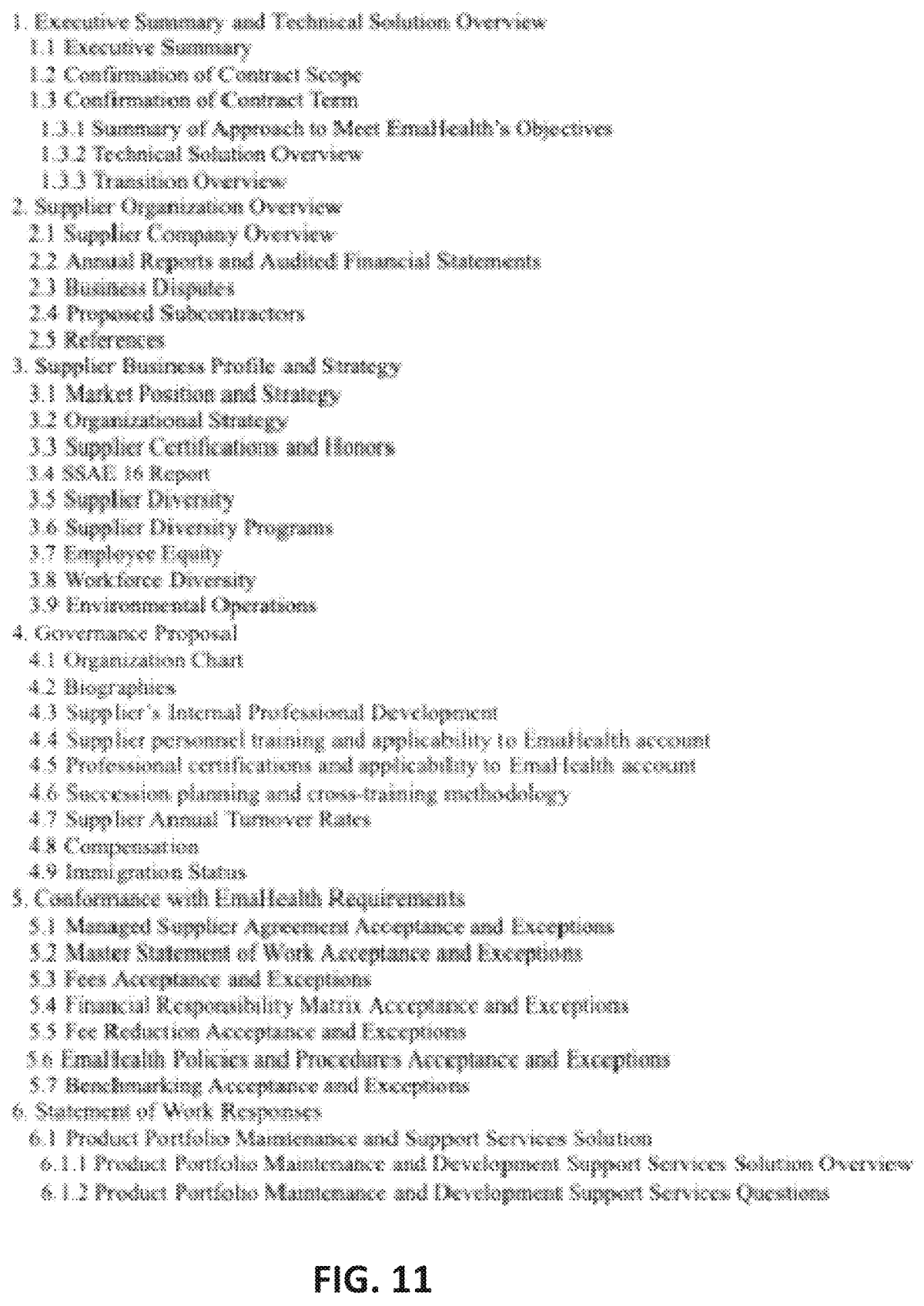

1. Executive Summary and Technical Solution Overview
  1.1 Executive Summary
  1.2 Confirmation of Contract Scope
  1.3 Confirmation of Contract Term
    1.3.1 Summary of Approach to Meet EmaHealth's Objectives
    1.3.2 Technical Solution Overview
    1.3.3 Transition Overview
2. Supplier Organization Overview
  2.1 Supplier Company Overview
  2.2 Annual Reports and Audited Financial Statements
  2.3 Business Disputes
  2.4 Proposed Subcontractors
  2.5 References
3. Supplier Business Profile and Strategy
  3.1 Market Position and Strategy
  3.2 Organizational Strategy
  3.3 Supplier Certifications and Honors
  3.4 SSAE 16 Report
  3.5 Supplier Diversity
  3.6 Supplier Diversity Programs
  3.7 Employee Equity
  3.8 Workforce Diversity
  3.9 Environmental Operations
4. Governance Proposal
  4.1 Organization Chart
  4.2 Biographies
  4.3 Supplier's Internal Professional Development
  4.4 Supplier personnel training and applicability to EmaHealth account
  4.5 Professional certifications and applicability to EmaHealth account
  4.6 Succession planning and cross-training methodology
  4.7 Supplier Annual Turnover Rates
  4.8 Compensation
  4.9 Immigration Status
5. Conformance with EmaHealth Requirements
  5.1 Managed Supplier Agreement Acceptance and Exceptions
  5.2 Master Statement of Work Acceptance and Exceptions
  5.3 Fees Acceptance and Exceptions
  5.4 Financial Responsibility Matrix Acceptance and Exceptions
  5.5 Fee Reduction Acceptance and Exceptions
  5.6 EmaHealth Policies and Procedures Acceptance and Exceptions
  5.7 Benchmarking Acceptance and Exceptions
6. Statement of Work Responses
  6.1 Product Portfolio Maintenance and Support Services Solution
    6.1.1 Product Portfolio Maintenance and Development Support Services Solution Overview
    6.1.2 Product Portfolio Maintenance and Development Support Services Questions

Semantic
graph
1220

Generation model
1230

Section writeup
1240

Write to content
item
1250

Display on
UI
1260

Feedback
1270

Search
query
1210

Status
management
1280

| Sections | Query / Writing order |
|---|---|
| Section 3 | 5 |
| Section 3.1 | 4 |
| Section 3.2 | 4 |
| Section 3.3 | 4 |
| Section 3.2.1 | 3 |
| Section 3.2.1.1 | 2 |
| Section 3.2.1.1.1 | 1 |
| Section 3.2.1.2 | 2 |

FIG. 15

Figure 16:
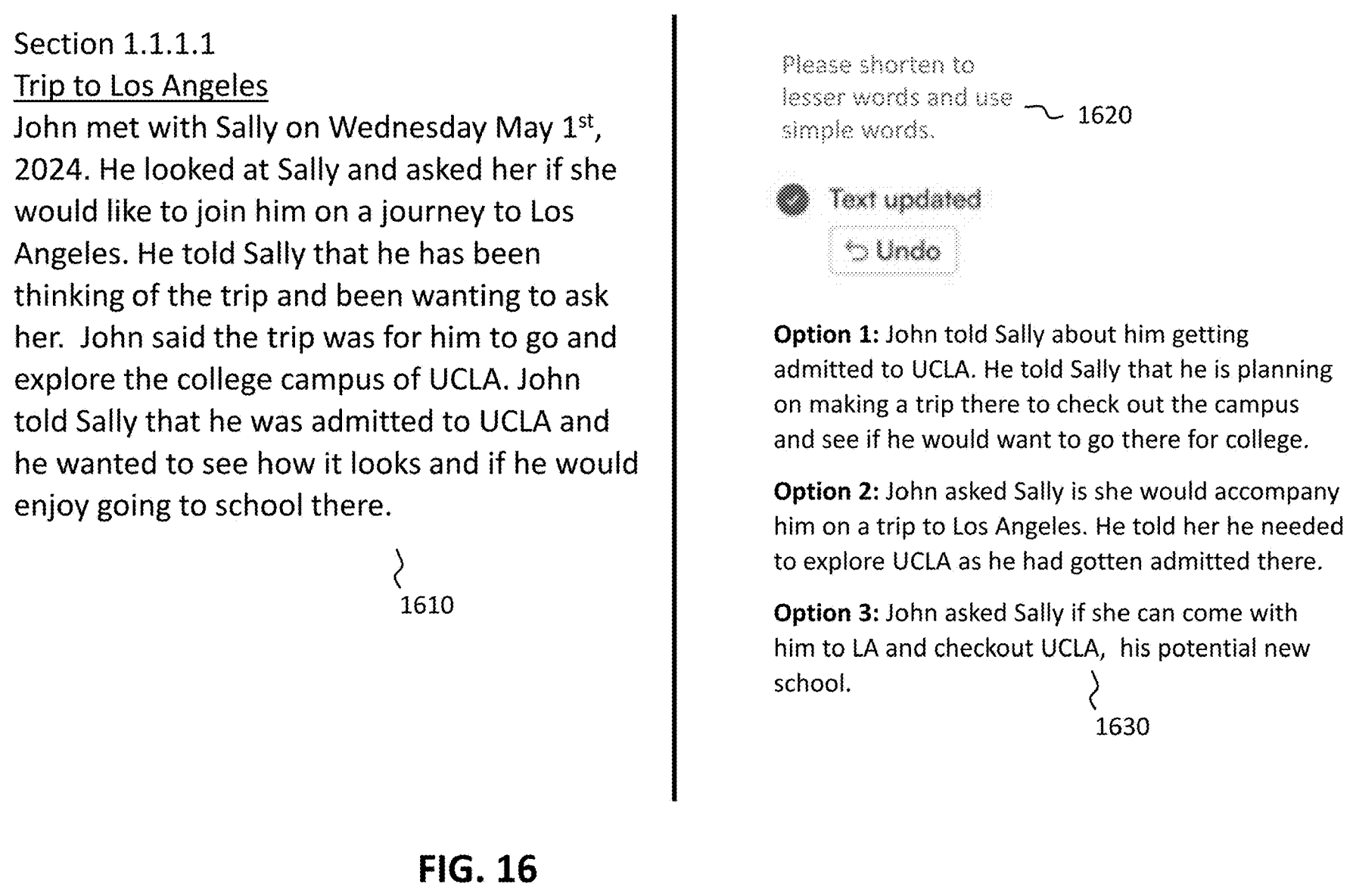

Please shorten to lesser words and use simple words. ~ 1620

● Text updated

⟲ Undo

Option 1: John told Sally about him getting admitted to UCLA. He told Sally that he is planning on making a trip there to check out the campus and see if he would want to go there for college.

Option 2: John asked Sally is she would accompany him on a trip to Los Angeles. He told her he needed to explore UCLA as he had gotten admitted there.

Option 3: John asked Sally if she can come with him to LA and checkout UCLA, his potential new school.

~ 1630

Section 1.1.1.1

Trip to Los Angeles

John met with Sally on Wednesday May 1st, 2024. He looked at Sally and asked her if she would like to join him on a journey to Los Angeles. He told Sally that he has been thinking of the trip and been wanting to ask her. John said the trip was for him to go and explore the college campus of UCLA. John told Sally that he was admitted to UCLA and he wanted to see how it looks and if he would enjoy going to school there.

Same page

Sections before Section -1
Section -2
Section -*n*

Sections after
Section +1
Section +2
Section + *n*

Before/After Pages
Page +1
Page +2
Page -1

Entire content item

1750
Rewrite / Regenerate and content item

1810
LLM

1820
Coherency Operation

1830
Final rewrite / regenerate

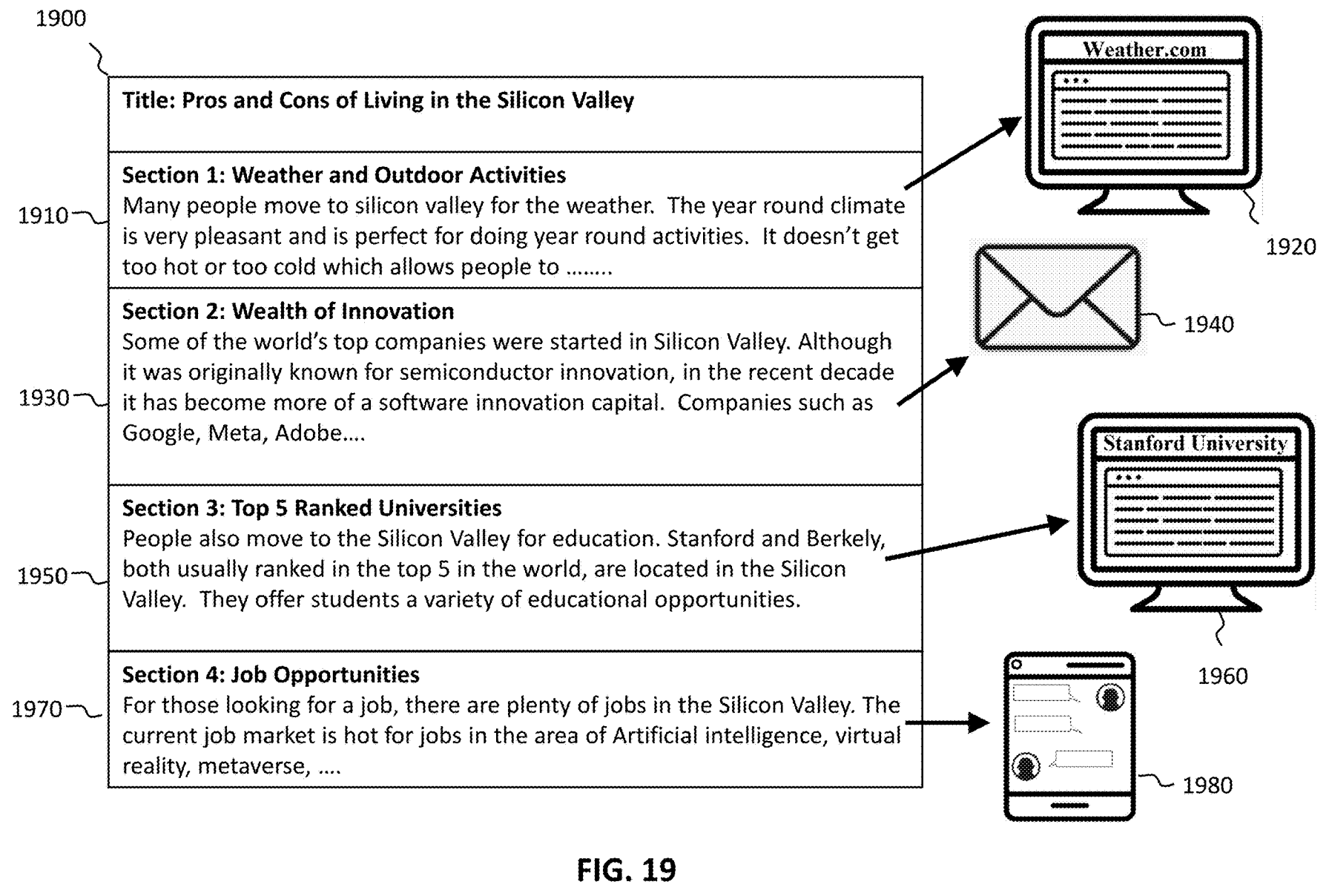

Title: Pros and Cons of Living in the Silicon Valley

Section 1: Weather and Outdoor Activities
Many people move to silicon valley for the weather. The year round climate is very pleasant and is perfect for doing year round activities. It doesn't get too hot or too cold which allows people to ........

Section 2: Wealth of Innovation
Some of the world's top companies were started in Silicon Valley. Although it was originally known for semiconductor innovation, in the recent decade it has become more of a software innovation capital. Companies such as Google, Meta, Adobe.....

Section 3: Top 5 Ranked Universities
People also move to the Silicon Valley for education. Stanford and Berkely, both usually ranked in the top 5 in the world, are located in the Silicon Valley. They offer students a variety of educational opportunities.

Section 4: Job Opportunities
For those looking for a job, there are plenty of jobs in the Silicon Valley. The current job market is hot for jobs in the area of Artificial intelligence, virtual reality, metaverse, ....

FIG. 19

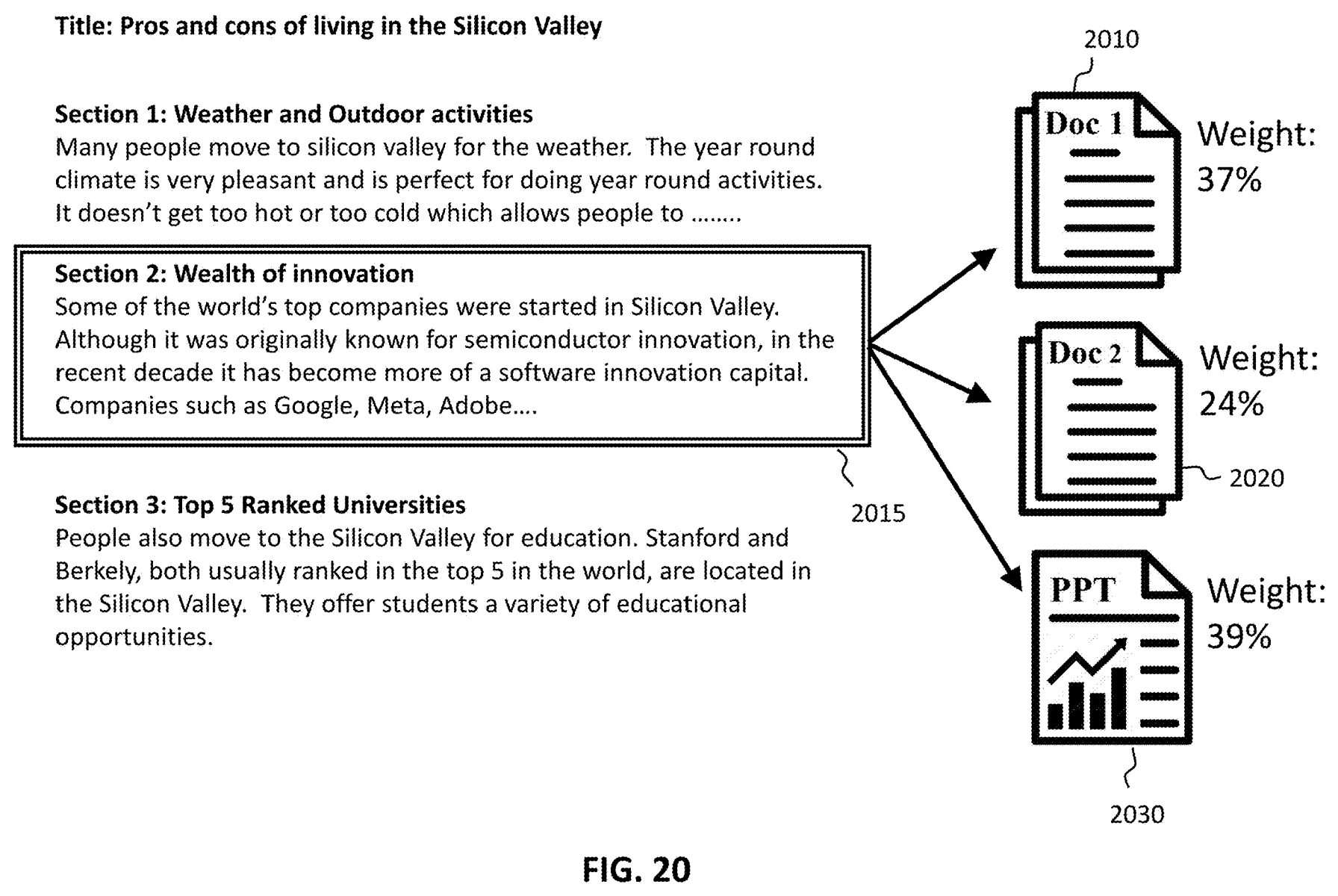

Title: Pros and cons of living in the Silicon Valley

Section 1: Weather and Outdoor activities
Many people move to silicon valley for the weather. The year round climate is very pleasant and is perfect for doing year round activities. It doesn't get too hot or too cold which allows people to .......

Section 2: Wealth of innovation
Some of the world's top companies were started in Silicon Valley. Although it was originally known for semiconductor innovation, in the recent decade it has become more of a software innovation capital. Companies such as Google, Meta, Adobe....

Section 3: Top 5 Ranked Universities
People also move to the Silicon Valley for education. Stanford and Berkely, both usually ranked in the top 5 in the world, are located in the Silicon Valley. They offer students a variety of educational opportunities.

2015

Doc 1 — Weight: 37%    2010

Doc 2 — Weight: 24%    2020

PPT — Weight: 39%    2030

FIG. 20

| Data type | Primary source of edit | Secondary source of edit |
|---|---|---|
| Financial data | Finance dept LLM | |
| Sales data | Website ABC, Page X | Website DEF, Page Y |
| Introductory paragraph | PowerPoint shared in email on May 8, 2024 | |
| Recommendations | Text message from Bob | |
| Policies | HR database | |
| Projections | Document 1 | Document 2 |

Figure 24:
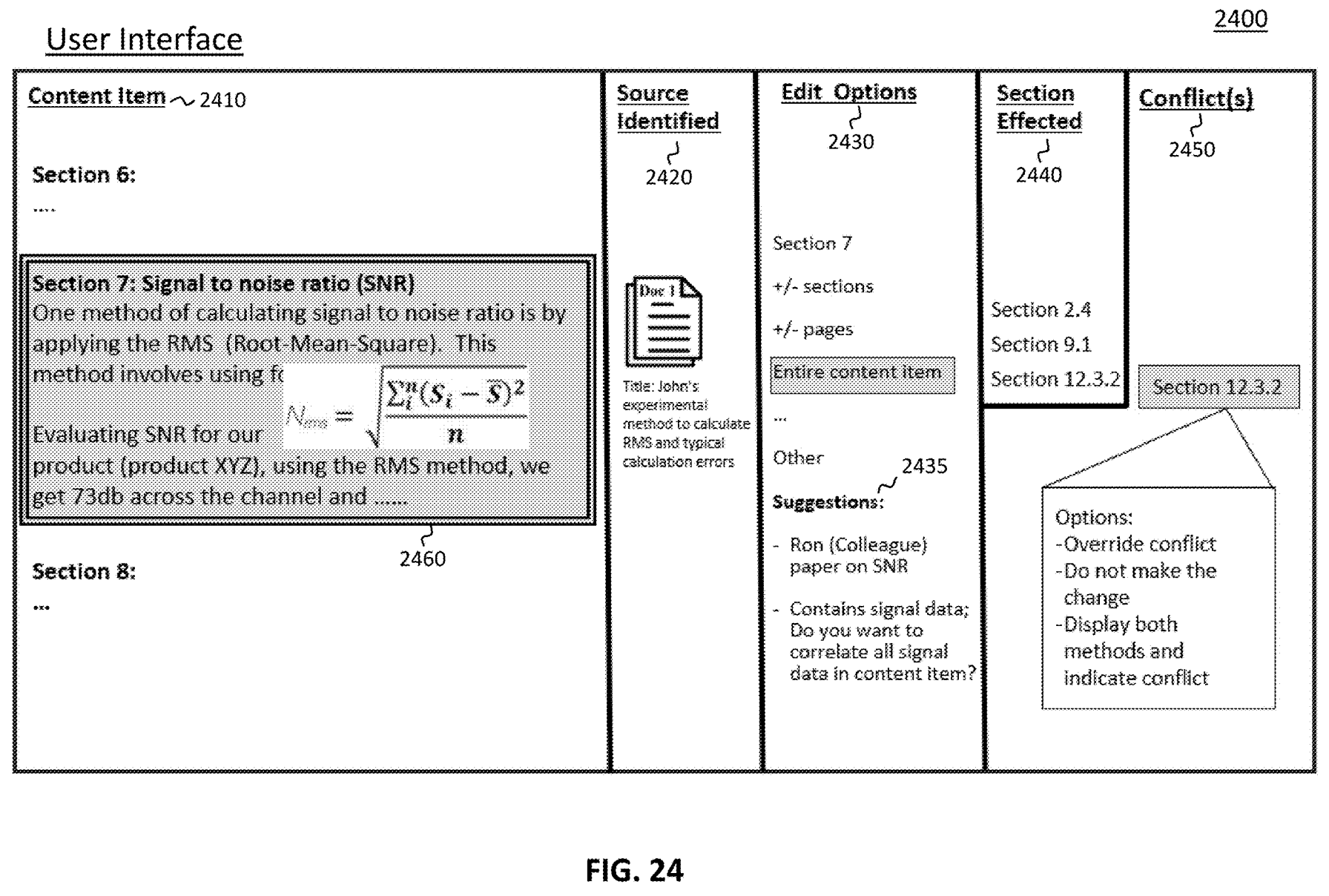

User Interface

Content Item ∼ 2410

Section 6:

....

Section 7: Signal to noise ratio (SNR)
One method of calculating signal to noise ratio is by applying the RMS (Root-Mean-Square). This method involves using fc Evaluating SNR for our product (product XYZ), using the RMS method, we get 73db across the channel and ......

$$N_{rms} = \sqrt{\frac{\sum_i^n (S_i - S)^2}{n}}$$

2460

Section 8:

...

Source Identified 2420

Title: John's experimental method to calculate RMS and typical calculation errors

Edit Options 2430

Section 7
+/- sections
+/- pages   Entire content item
...
Other   2435

Suggestions:
- Ron (Colleague) paper on SNR
- Contains signal data; Do you want to correlate all signal data in content item?

Section Effected 2440

Section 2.4
Section 9.1
Section 12.3.2

Conflict(s) 2450

Section 12.3.2

Options:
- Override conflict
- Do not make the change
- Display both methods and indicate conflict

SYSTEMS AND METHODS FOR USING LARGE LANGUAGE MODEL(S) TO WRITE, EDIT, AND REWRITE COHERENT CONTENT ITEMS

CROSS-REFERENCE TO RELATED APPLICATIONS

This application is a continuation-in-part (CIP) of U.S. patent application Ser. No. 18/672,005, filed May 23, 2024, the disclosures of this application are incorporated herein by reference in their entirety.

FIELD OF DISCLOSURE

Embodiments of the present disclosure relate to using language models to edit text or sections of a generated content item based on provided sources and ensuring coherency between the edited and unedited sections of the content item. Embodiments of the present disclosure also relate to generating the content item by automatically populating a content item template by leveraging a semantic graph generated using a language model.

BACKGROUND

Artificial intelligence (AI) chatbots, such as ChatGPT™, Bard™, Llama™, Bing Chat™, Claude™, and Jasper™, are used for obtaining answers to queries or generating short documents, such as emails, resumes, and letters. When a user asks an AI chatbot to generate a resume, the chatbot utilizes large language model (LLM) data and user input to generate the resume. Likewise, when a user asks an AI chatbot to generate a short form document, such as a post interview thank you letter, the chatbot once again utilizes LLM data and user input that may include the name of the company that the user interviewed with to generate the thank you letter.

Although AI chatbots can generate text for short length documents, they are still in their early stages and not capable of generating complex and coherent long form documents or providing advanced editing functionality. This is because the longer documents include complex layers and hierarchy of sections, varying linguistic elements, and one section contextually referring to another section. To generate such long form documents using the existing techniques, among other elements, a large input of data may be required. More specifically, since user input is required by the currently existing chatbots to determine the context and layout of the document, in their current state, if the chatbots were to attempt generating a longer document, which they cannot, they would require a larger user input or guidance to determine the context and layout of the larger document. A larger input translates to a larger token limit for the chatbot to be able to accept the larger input. Since current chatbots are limited in their token size, e.g., varying between 16 k tokens to 200 k tokens, with some outliers nearing a maximum of 1 m tokens, their working memory does not allow for a large input and when attempted gives an error message. As such, users are required to break a large input into smaller chunks of data and feed it to the chatbot. When larger input is broken into smaller chunks, the flow in the document and big picture is often lost. Furthermore, feeding smaller chunks may result in inconsistencies through the document where different portions may contradict each other.

Yet another drawback of the current LLM leveraged techniques is that editing a document requires regeneration of the entire document. If a resume or a post interview thank you letter is to be edited, in many instances, the user may have to start over and provide a new input to the chatbot with a new set of instructions. When a new input with instructions is given to the chatbot to edit a portion of the text generated, e.g. a paragraph of the thank you letter, chatbot may regenerate the entire document and the portion in the new document may be generated based on the instructions provided, however, the text in other portions of the document may no longer be in flow with the edited portion and the document overall may appear to be a compilation of a few disjointed paragraphs.

As such, there is a need for methods and systems for taking inputs and generating strategically coherent and systematically presented large scale content items and providing functionality to edit the large-scale content items such that they provide coherency and flow across the document.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings and disclosure. The various objects and advantages of the disclosure will be apparent upon consideration of the following detailed description, taken in conjunction with the accompanying drawings, in which like reference characters refer to like parts throughout, and in which:

FIG. 1 is a flowchart of an example of a process for generating, editing, and rewriting a long form business content item using a private LLM, in accordance with some embodiments of the disclosure;

FIG. 6 is a block diagram of user requests and suggested user requests for generating a long form business content item, in accordance with some embodiments of the disclosure;

FIG. 7 is an example of a user request for generating a long form business content item, in accordance with some embodiments of the disclosure;

FIG. 11 is an example of a generated template, in accordance with some embodiments of the disclosure;

Figure 15:
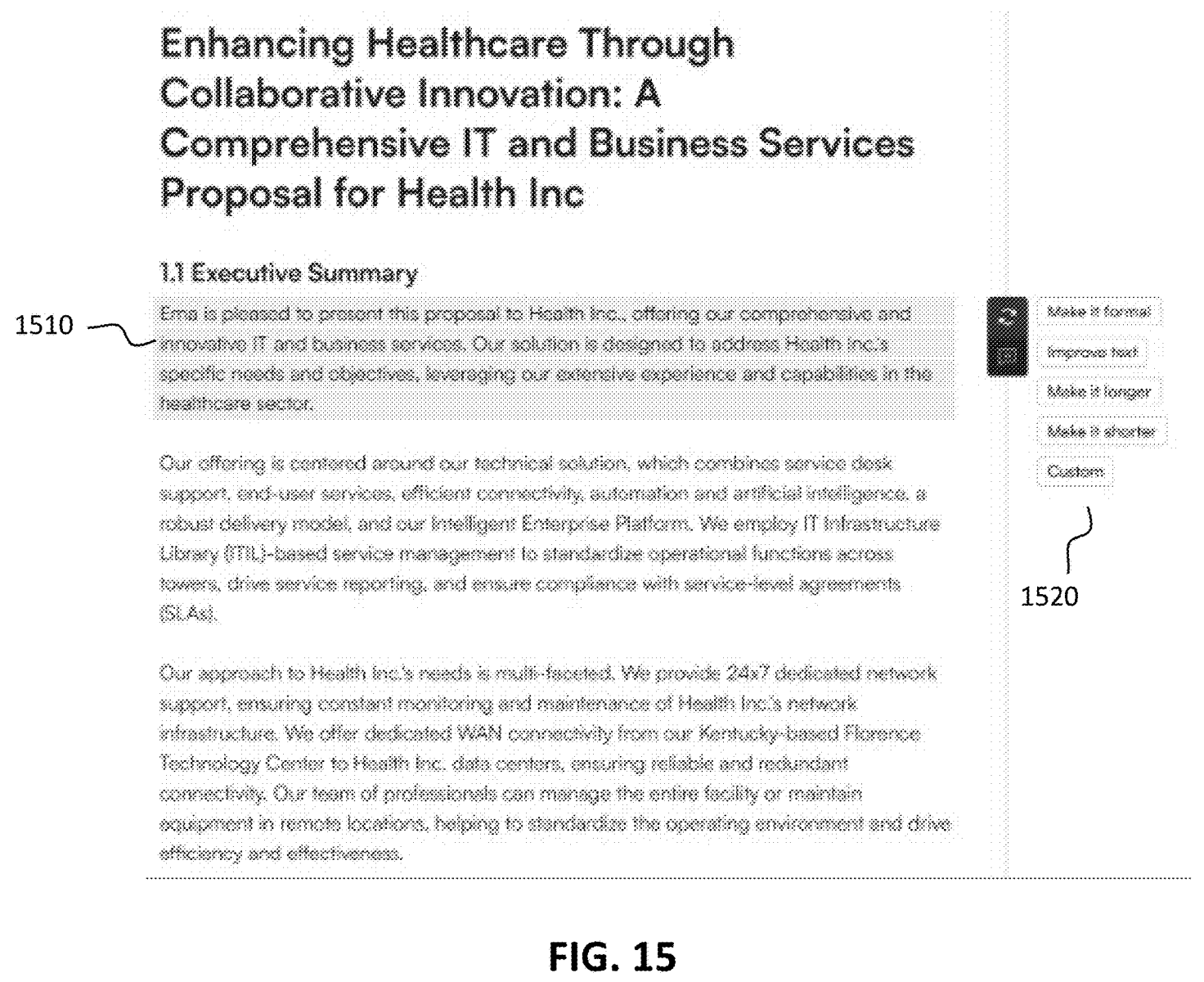

FIG. 15 is an example of obtaining and processing a per layer or section-by-section feedback in accordance with some embodiments of the disclosure;

FIG. 16 is an example of receiving feedback, editing and/or suggesting edits based on feedback, and regenerating the write-up, in accordance with some embodiments of the disclosure;

FIG. 19 is an example of using a separate source for editing each of the plurality of sections of the content item, in accordance with some embodiments of the disclosure;

FIG. 20 is an example of receiving a plurality of weighted sources for editing and rewriting a single section of the content item, in accordance with some embodiments of the disclosure;

FIG. 22 is an example of using separate primary and secondary sources for each of the plurality of sections of the content item for editing and rewriting the plurality of sections, in accordance with some embodiments of the disclosure;

FIG. 24 is a block diagram of an example of a user interface used for editing the content item, in accordance with some embodiments of the disclosure.

DETAILED DESCRIPTION

Figure 2A:
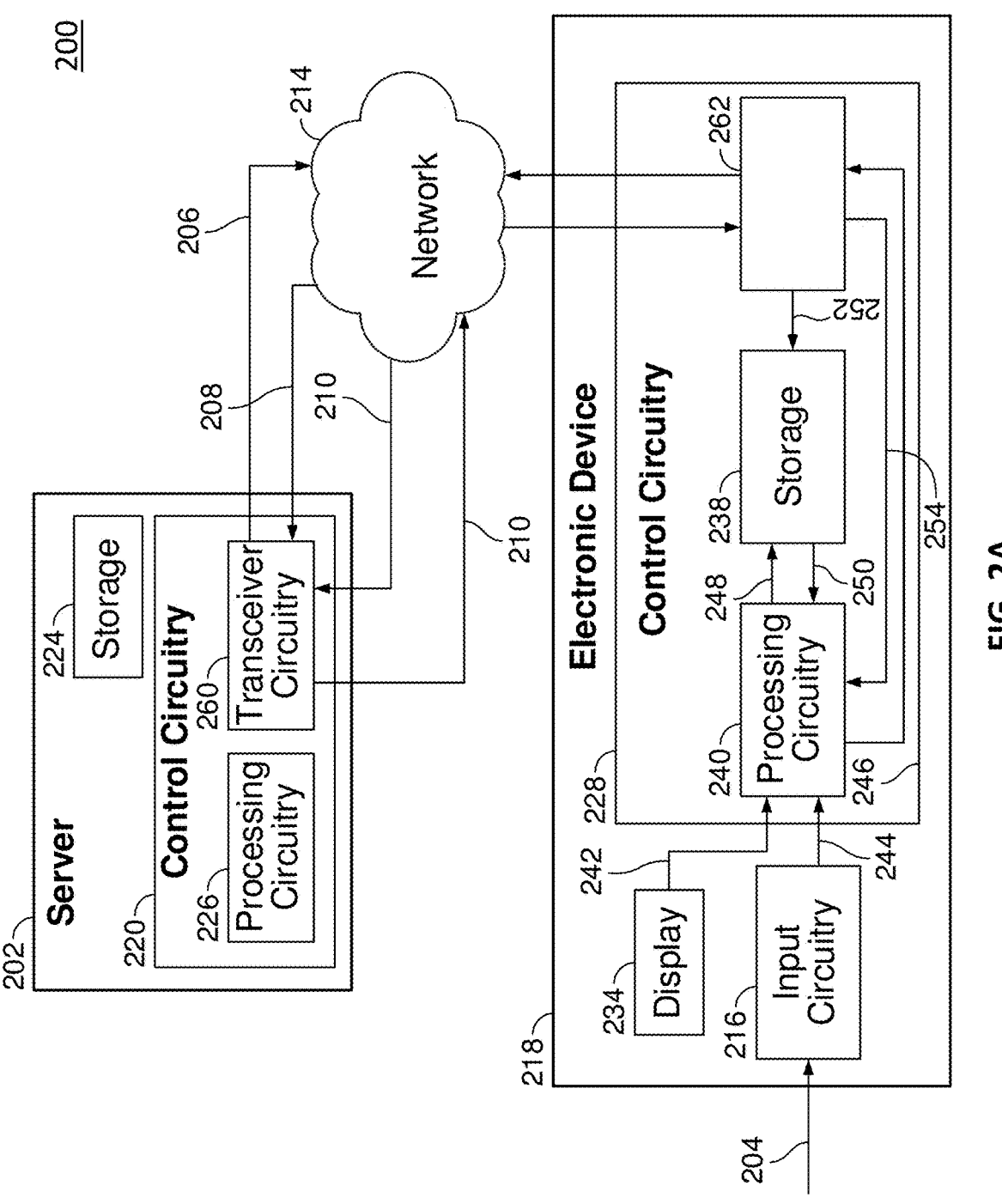
FIG. 2A is a block diagram of an example of an electronic device or user device for generating, editing, and rewriting a long form business content item, in accordance with some embodiments of the disclosure.

In accordance with some embodiments disclosed herein, some of the above-mentioned limitations are overcome by leveraging a large language model (LLM) to generate a long form content item and providing editing functionally that allows editing using a section-by-section or layer-by-layer approach using provided sources while ensuring coherency through the content item when any one its sections are edited.

With respect to leveraging an LLM to generate a long form content item, in accordance with some embodiments disclosed herein, some of the above-mentioned limitations are overcome by using an LLM to automatically generate a semantic graph that includes data indexed to a plurality of private enterprise data sources to which the user is authorized access. The LLM also generates a template having a plurality of sections that are to be populated with relevant private enterprise data indexed in the semantic graph. The LLM queries the semantic graph for each section in the generated templated, the querying order being based on section hierarchy with the finest grained or bottom most subsection being queried first, to access and/or obtain relevant indexed data from the data sources and use it to populate/write the sections of the generated template and generate the content item, e.g., the long form business content item.

With respect to editing one or more sections of the generated content item based on one or more sources provided, in accordance with some embodiments disclosed herein, some of the above-mentioned limitations are overcome by receiving a request to edit or regenerate a particular section, from the plurality of sections, of the content item generated. The editing request, in some embodiments, may be received when a user hovers over a section of the content item or selects the content item, such as with a cursor or with a hand/pen if using a touchscreen device. The particular section for which the edit is requested may be highlighted, bolded, italicized or visually distinguished in some other manner from other sections that are not the subject of the edit request. The received request includes a link to the one or more sources that are to be used for editing and regenerating the particular section. When more than one source is provided, the sources are weighted based on a plurality of weighting factors and used in accordance with their weighted score/percentage. For example, data from a higher weighted source may take priority over data from a lower weighted source if there is a difference of opinion or one conflicts with the other. The raw data from the sources provided may be indexed and a language model, such as a small language model (LM) or large language model, may be used to narrow from the larger set of raw data from the sources to a narrow set of data that is relevant to the identified text or section that is to be edited. The LLM, using the identified text/section as input may query the index to obtain data relevant to the identified text/section that is to be edited. The data obtained from the query, which is a refined and narrow set of data from the source(s) provided, is then used to edit, rewrite and/or regenerate the identified text/section. The LLM may also check for coherency overall across the content item to determine whether the text that has been identified for editing, also referred to herein as identified text, which includes any text of the content item such as a section, subsection, sentence, group of sentences, page, a plurality of pages, a topic, makes other text, portions of text, sections, paragraphs, pages incoherent. In some embodiments, the LLM may determine a coherency value of all sections in the template prior to the editing of any section and then compare the coherency value prior to editing with coherency value of all the sections after the editing of a particular section to determine if coherency of any section has changed. For example, post editing of a particular section, the particular section edited may be taken as a primary section or a gold standard to then evaluate coherency values of all the unedited sections based on the gold standard. Since coherency of one section is not evaluated in silo and is evaluated with respect to its neighboring sections, and sometimes the entire content item, coherency of the unedited sections is evaluated with respect to coherency of the edited section. If the coherency value indicates a change of the unedited section (i.e. to its coherency) more than a threshold level or threshold percentage of coherency change after the editing of the particular section, then a determination may be made that the unedited sections have become incoherent due to editing of the particular section and as such need to be edited to make them coherent. The LLM may also check sections of the content item to ensure that proper logical and stylistic flow from one section to another is maintained, i.e., after the edits are performed on any one section of the content item. The LLM may then be used to edit the entire content item, page on which the identified text is edited, or certain paragraphs to make them coherent with the edited section. The LLM may also identify any inconsistencies or conflicts caused to other text, portions of text, sections, paragraphs, pages due to the editing of the identified text or section. If inconsistencies or conflicts are detected, rules of conflict resolution may be used by the LLM to cure the inconsistencies or conflicts.

Turning now to figures, FIG. 1 is a flowchart of an example of a process for generating, editing, and rewriting a long form business content item using a private LLM, in accordance with some embodiments of the disclosure. Process 100, as depicted in FIG. 1, may be implemented, in whole or in part, by systems or devices such as those shown in FIGS. 2-3. One or more actions of the process 100 may be incorporated into or combined with one or more actions of any other process or embodiments described herein. The process 100 may be saved to a memory or storage (e.g., any one of those depicted in FIGS. 2-3) as one or more instructions or routines that may be executed by a corresponding device or system to implement the method 100.

In some embodiments, block 105 relates to generating of a template having a plurality of sections and subsections, also referred to as nodes, using a bottom-up approach to populate those sections with content, querying a semantic graph, that may be generated by an LLM, to access content for each section to be populated, and populating all the sections in the template to generate a long form content item. More broadly, block 105 refers to generating a template, leveraging a semantic graph, and populating the template to generate the content item.

In some embodiments, block 150 relates to editing, rewriting, and/or regenerating of one or more sections of the content item generated at block 105. Such editing, rewriting, and/or regenerating is performed by using one or more identified content sources. The content sources may be identified via a link by a user device or by the system. Raw data from the identified content sources is narrowed to data that is relevant to the one or more sections of the content item that are to be edited. Rewriting or regenerating a section, sub-section, or any or all portions of a content item requires complex analyses, operations, and transformation of data from the data source provided, e.g., it may require understanding the text or other form of data in the source provided, a determination of what portion of the text or other form of data to use, and how to use such text or other form of data to blend into the current a section, sub-section, or any or all portions of a content item, determining whether such use of the transformed text or other form of data from the provided source correlates and conforms with other portions of the section, sub-section, or any or all portions of a content item (e.g., does it correlate logically, stylistically, coherently, linguistically, grammatically etc.). In other words, its is not the case of simply copying the data from another source into a section of the content item, since that would also violate copyright laws. Instead, the control circuitry of the system, such as the system in FIG. 2A, perform a much deeper analysis and understanding of the source provided, such as by using deep learning techniques, and then using an LLM to analyze data from the source and ensuring the data is relevant to the section for which it is intended. The LLM also ensures that the data flows logically, stylistically, coherently, linguistically, and grammatically in the section in which it is to be populated. Since the source provided may be of any form, e.g. weblink, link to a specific page of a website, document, application, database, email, text message or a conversation between two individuals, a voice note, a video, a book, an excel file, an accounting file, sales data, etc., the embodiments described, using control circuitry and an LLM ensure that source is analyzed, understood, and used in a way that appropriately blends into the currently written content item such that it coherently flows and reads as one single document and not disjointed sections from different sources. The control circuitry further ensures, among other things, by using an LLM, that the section edited, rewritten, or regenerated also flows logically, stylistically, coherently, linguistically, grammatically etc. with other sections and pages of the content item, including, but not limited to, if the section edited, rewritten, or regenerated creates a conflict with any other the section, sub-section, or any or all portions of a content item.

The process 100, in some embodiments, includes receiving a user or system request for generating a content item, at block 110.

At block 120, a template is generated based on the received request. The template may be a table of contents or some other hierarchy that includes a plurality of sections or nodes, where some or all of the sections or nodes in the plurality of sections or nodes may have one or more layers of nested subsections or sub-nodes. The type, nature, format, and extent of the template may depend on the type of request made. For example, a request to generate an employee handbook may have numerous sections of the template being generated for a large international organization while a request to write a children's book may have fewer sections and subsections.

At block 130, the sections and subsections of the generated template may be populated. The order of populating the sections and subsections may use a bottoms-up or a most fine-grained subsection to the least fine-grained subsection approach. The population of each section may include querying a semantic graph to obtain the data relevant to the section or subsection to be populated. The semantic graph, which is generated by an LLM, may index data stored in one or more applications, databases, libraries, or some other repository and provide or point to the data based on the queries received.

At block 140, once the data to be populated is identified, it may be analyzed, processed, and transformed as needed to then be populated into the section or subsection for which it was queried. The data analysis, processing, and transformation may allow an LLM to use deep learning to classify the data and use it in a manner best suited to populate the section or sub-section. In other words, it may not be a simple copying of the data, but instead an original write using the data accessed. In some embodiments, however, as needed and if copyright laws are observed, some data may be copied or referred to with proper citations and then inputted into the section or subsection as determined by the LLM. Further details of the process of steps 110-140 are described in FIGS. 3-16.

At block 150, once the write operation is completed at block 140, the control circuitry, such control circuitry 220 and/or 228 of FIG. 2A, may provide editing options to re-write, edit, or regenerate the sections already written at block 140.

The process of editing, re-writing, and regenerating, as further described in FIGS. 17-24, may include receiving a request to rewrite a particular section. One or more sources being identified for use in editing the identified particular section. The raw data from the source being indexed, such as by using an LLM. The raw data being narrowed to a relevant set and fed as input into an LLM along with the identified text that is to be edited. As referred to herein identified text may be any text in the content item. It may be a paragraph, a section, a page, a sentence, a group of sentences, or text relating to a particular genre, such as sales data, introductory paragraph, etc. The LLM generates a plurality of targeted queries to the generated index to obtain a further narrowed set of data that is more accurate and relevant to the identified text that is to be edited. The narrowed data resulting from the queries may then be used by the LLM (or a different LLM) to rewrite and regenerate the text identified for editing. A process to synchronize other sections in the content item to make them coherent with the section edited may be performed. The process may also allow synchronization of any other writing element, such as style, grammar, language, etc. The process may include rewriting some or all the other unedited sections that were identified for editing to make them coherent with the edited section. Any missing data, conflicts of data, and other anomalies may also be addressed by the synchronization process. Further detail of such editing and processes used are described below in relation to the description of FIGS. 17-24.

Figure 2B:
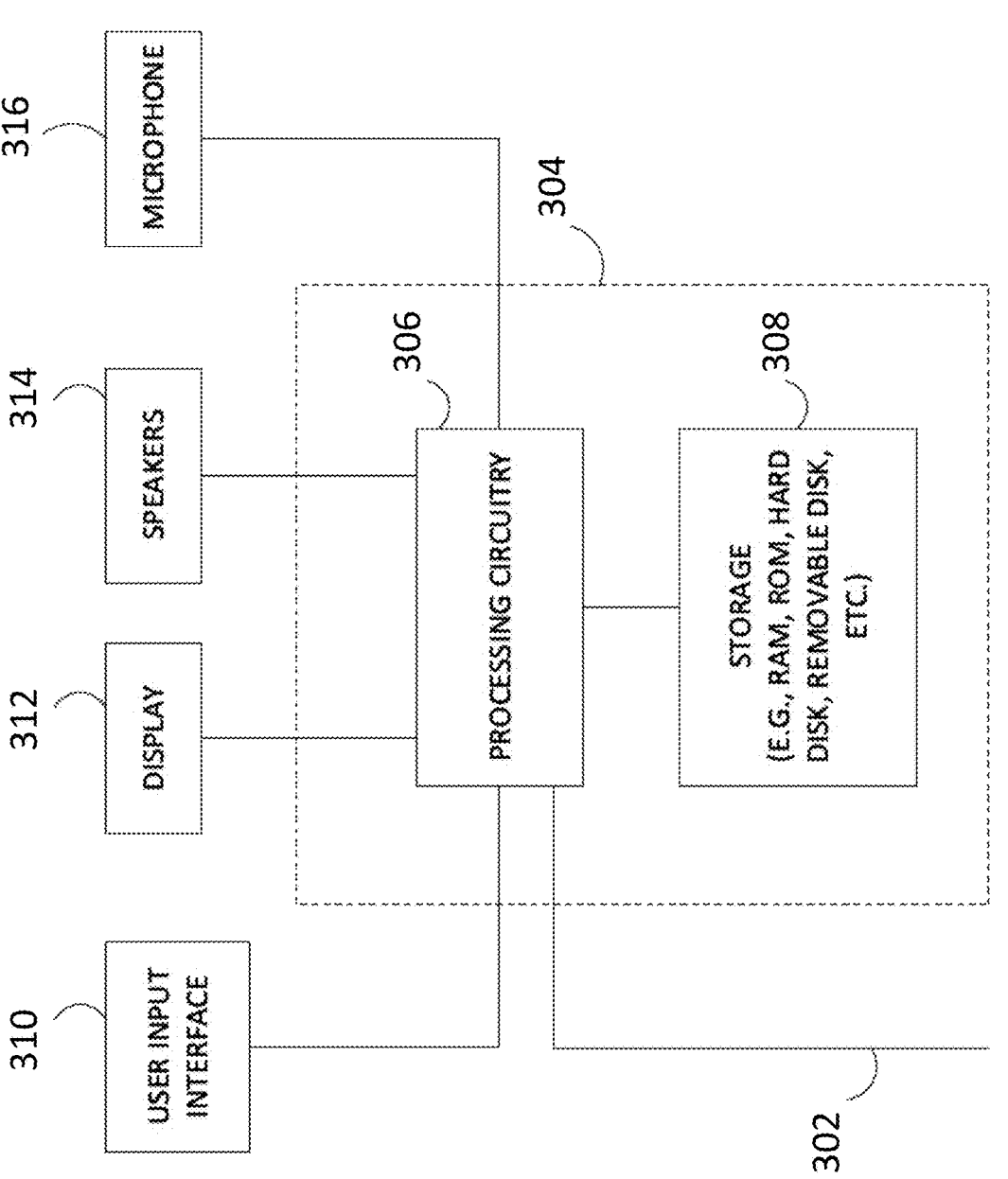
FIG. 2B is a block diagram of an example of an electronic device or user device for generating, editing, and rewriting a long form business content item, in accordance with some embodiments of the disclosure.

FIG. 2A is a block diagram of an example of a system for generating, editing, and rewriting a long form business content item, in accordance with some embodiments of the disclosure and FIG. 2B is a block diagram of an example of an electronic device or user device for generating, editing, and rewriting a long form business content item, in accordance with some embodiments of the disclosure.

FIGS. 2A and 2B also describe exemplary devices, systems, servers, and related hardware that may be used to implement processes, functions, elements and components, and functionalities described in relation to FIGS. 1 and 3-24. Further, FIGS. 2A and 2B may also be used to generate semantic graph(s), generate a long form business content item using private enterprise data, detect user connections with data sources, such as private enterprise data sources connected via login, access data sources connected by the user devices, organize data sources on a user interface, such as by topic, genre, category of enterprise function (e.g., sales, accounting, HR, ticketing, etc.), generate a semantic graph for the data/data items accessed from the data sources, performing initial and subsequent synchronization of data between semantic graph, data pipelines, and data sources to ensure any changes in data are updated, generate associations between data items accessed from the data sources in the semantic graph, indexing data items in the semantic graphs where the indexes point to the data source at which each data item is stored, receive user input on the type of content item, such as a long form business content item to be generated, which includes but is not limited to documents, excel or other related computational files, presentations, slides, guides, etc., receive user input from the system, such as based on AI or ML recommendations, on the type of content item, such as a long form business content item to be generated, generating a template based on the user or system input received, the template being a table of contents in some embodiments, performing a search query for each of the nodes, sections, sub-sections, leaves of the template, determining the most fine-grained node, section, sub-section, leaf of the template, determining the most fine-grained node, section, sub-section, leaf of a particular section in the template, starting the search query with the determined most fine-grained node, section, sub-section, leaf of the template or a section within the template, searching the semantic graph for data items that are relevant to the search query, e.g., to the most fine-grained node, section, sub-section, leaf of the template, obtaining relevant data items based on the search query, such from the data sourced indexed in the semantic graph, performing a write operation in the template in the most fine-grained node, section, sub-section, leaf of the template, for which the search query was conducted, repeating the search queries for all sections, sub-sections, modes, leaves in the template until all sections and subsections are completed, parallel processing and simultaneously searching and writing to sections and subsections that are on a same layer/level, determining identity of the user, including determining user job titles and designations, user access to data sources, including which data sources are authorized to be accessed by the user, determining enterprise identity, customizing the templates and semantic graphs based on user identity, enterprise identity, or both, publishing the final content or section by section as it is written to a user interface of a user device, providing feedback and editing capabilities, the provided editing and feedback capabilities including allowing feedback using a per layer, section-by-section, or layer-by-layer approach, highlighting sections for feedback, dynamically updating the section and any other related sections based on the feedback, updating semantic graphs based on the feedback, receiving one or more sources that are to be used in editing an identified section of the content item, receiving one or more different sources that are to be used in editing multiple sections of the content item, accessing and indexing the raw data from the identified one or more sources, indexing using various techniques including using an LLM, identifying relevant data from the indexed raw data, using an LLM to generate queries to the indexed raw data for identifying data that is relevant to the identified text, the queries being formulated by the LLM based on the identified text, using the narrow set of relevant data that results after the querying to rewrite and/or regenerate the identified section, where the rewrite and regenerate is performed using relevant data from the identified one or more sources, determining coherency of other sections, subsections, pages of the content item with the rewritten and regenerated identified text, when incoherency with the rewritten and regenerated identified text is determined, rewriting and regenerating the sections, subsections, pages of the content item such that they are coherent with the rewritten and regenerated identified text, determining which source to use or how to prioritize or weight the source when more than one source is provided for editing the identified text, using a plurality of factors to weight the source when more than one source is provided, displaying editing options, receiving a selection of editing options which include a selection of a portion, section, sub-section of the content item, to be edited, rewritten, and regenerated to be coherent with the edited text, determining conflicts caused in other sections of the content item when one section of the content item is edited using a provided source, providing various conflict resolution options for selection, resolving the conflict based on the conflict resolution selection options, displaying a user interface that includes sections of the content item, sources used for editing, editing options, other sections affected in the content item when one section is edited, and conflict identification and resolution options, and performing all the functions, steps, features, discussed herein.

In some embodiments, one or more parts of, or the entirety of system 200, may be configured as a system implementing various features, processes, functionalities and components of FIGS. 1 and 3-24. Although FIG. 2A shows a certain number of components, in various examples, system 200 may include fewer than the illustrated number of components and/or multiples of one or more of the illustrated number of components.

System 200 is shown to include a computing device 218, a server 202 and a communication network 214. The system may be a generative artificial intelligence system that uses AI bots and agents and that leverages one or more large language models (LLMs), neural networks, and other similar AI type systems. It is understood that a single instance of a component may be shown and described relative to FIG. 2A, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2A, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as user device 300 of FIG. 2B.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, solid state devices, quantum storage devices, or any other suitable fixed or removable storage devices, and/or any combination of the same. Each storage 224, 238 may be used to store various types of data (e.g., user login and connections with various data sources, templates, including all sections in the templates, hierarchy or sections and nodes in the template, semantic graphs and updates to semantic graphs, data sources organization structure, such as by genre, data indexed in semantic graphs, association between data items listed in the semantic graphs, data written into a section, feedback received, identity of person and their access authorizations and permissions, person's tasks and agenda, input from user or system as to type of content item to create, data related to employee job titles and designations, sources identified for use in editing identified text, weighting scores associated with the sources, identification of which sections became incoherent due to editing of one of the sections of the content item using the identified source, selection of editing options, indexing of raw data associated with the identified source, search queries to the index containing raw data, narrowed set of data relevant to the identified text that is obtained based on the queries to the indexed data and NLP, ML, and AI algorithms). Non-volatile memory may also be used (e.g., to launch a boot-up routine and other instructions). Cloud-based storage may be used to supplement storages 224, 238 or instead of storages 224, 238. In some embodiments, data relating to user login and connections with various data sources, templates, including all sections in the templates, hierarchy or sections and nodes in the template, semantic graphs and updates to semantic graphs, data sources organization structure, such as by genre, data indexed in semantic graphs, association between data items listed in the semantic graphs, data written into a section, feedback received, identity of person and their access authorizations and permissions, person's tasks and agenda, input from user or system as to type of content item to create and NLP, ML, and AI algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response determining that a user device has connected to a data source, or a plurality of data sources, such as by logging in, or that a user device is provided authorized access to a plurality of data sources, regardless of whether the user device has logged in to them, the system may automatically generate semantic graph(s) for all data/data items that are stored in the data sources to which the user device has connected or is authorized to connect. To accomplish this, in one embodiment, the control circuitry 228 may perform the steps of process described at least in any one or more of FIGS. 1 and 5 and all the steps and processes described in all the figures depicted herein.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive data such as data relating to user login and connections with various data sources, templates, including all sections in the templates, hierarchy or sections and nodes in the template, semantic graphs and updates to semantic graphs, data sources organization structure, such as by genre, data indexed in semantic graphs, association between data items listed in the semantic graphs, data written into a section, feedback received, identity of person and their access authorizations and permissions, person's tasks and agenda, input from user or system as to type of content item to create, data related to employee job titles and designations, sources identified for use in editing identified text, weighting scores associated with the sources, identification of which sections became incoherent due to editing of one of the sections of the content item using the identified source, selection of editing options, indexing of raw data associated with the identified source, search queries to the index containing raw data, narrowed set of data relevant to the identified text that is obtained based on the queries to the indexed data and NLP, ML, and AI algorithms.

Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In non limiting examples, computing device 218 may be a personal computer (PC), a laptop computer, a tablet computer, a personal computer, a generative AI server, a handheld computer, a mobile telephone, a smartphone, or any other device, computing equipment, or wireless device, and/or combination thereof that can receive user device inputs related to generating long form content items, generating semantic graphs by using LLMs, generating templates, and writing into templates by data obtained through querying semantic graphs as discussed herein.

Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors or Nvidia processors) or multiple different processors (e.g., an Intel Core i7 and i9 processors or Nvidia GH 100, 200).

In some embodiments, control circuitry 220 and/or control circuitry 218 are configured to generate semantic graph(s), generate a long form business content item using private enterprise data, detect user connections with data sources, such as private enterprise data sources connected via login, access data sources connected by the user devices, organize data sources on a user interface, such as by topic, genre, category of enterprise function (e.g., sales, accounting, HR, ticketing, etc.), generate a semantic graph for the data/data items accessed from the data sources, performing initial and subsequent synchronization of data between semantic graph, data pipelines, and data sources to ensure any changes in data are updated, generate associations between data items accessed from the data sources in the semantic graph, indexing data items in the semantic graphs where the indexes point to the data source at which each data item is stored, receive user input on the type of content item, such as a long form business content item to be generated, which includes but is not limited to documents, excel or other related computational files, presentations, slides, guides, etc., receive user input from the system, such as based on AI or ML recommendations, on the type of content item, such as a long form business content item to be generated, generating a template based on the user or system input received, the template being a table of contents in some embodiments, performing a search query for each of the nodes, sections, sub-sections, leaves of the template, determining the most fine-grained node, section, sub-section, leaf of the template, determining the most fine-grained node, section, sub-section, leaf of a particular section in the template, starting the search query with the determined most fine-grained node, section, sub-section, leaf of the template or a section within the template, searching the semantic graph for data items that are relevant to the search query, e.g., to the most fine-grained node, section, sub-section, leaf of the template, obtaining relevant data items based on the search query, such from the data sourced indexed in the semantic graph, performing a write operation in the template in the most fine-grained node, section, sub-section, leaf of the template, for which the search query was conducted, repeating the search queries for all sections, sub-sections, modes, leaves in the template until all sections and subsections are completed, parallel processing and simultaneously searching and writing to sections and subsections that are on a same layer/level, determining identity of the user, including determining user job titles and designations, user access to data sources, including which data sources are authorized to be accessed by the user, determining enterprise identify, customizing the templates and semantic graphs based on user identity, enterprise identity, or both, publishing the final content or section by section as it is written to a user interface of a user device, providing feedback and editing capabilities, the provided editing and feedback capabilities including allowing feedback using a per layer, section-by-section, or layer-by-layer approach, highlighting sections for feedback, dynamically updating the section and any other related sections based on the feedback, updating semantic graphs based on the feedback, receiving one or more sources that are to be used in editing an identified section of the content item, receiving one or more different sources that are to be used in editing multiple sections of the content item, accessing and indexing the raw data from the identified one or more sources, indexing using various techniques including using an LLM, identifying relevant data from the indexed raw data, using an LLM to generate queries to the indexed raw data for identifying data that is relevant to the identified text, the queries being formulated by the LLM based on the identified text, using the narrow set of relevant data that results after the querying to rewrite and/or regenerate the identified section, where the rewrite and regenerate is performed using relevant data from the identified one or more sources, determining coherency of other sections, subsections, pages of the content item with the rewritten and regenerated identified text, when incoherency with the rewritten and regenerated identified text is determined, rewriting and regenerating the sections, subsections, pages of the content item such that they are coherent with the rewritten and regenerated identified text, determining which source to use or how to prioritize or weight the source when more than one source is provided for editing the identified text, using a plurality of factors to weight the source when more than one source is provided, displaying editing options, receiving a selection of editing options which include a selection of a portion, section, sub-section of the content item, to be edited, rewritten, and regenerated to be coherent with the edited text, determining conflicts caused in other sections of the content item when one section of the content item is edited using a provided source, providing various conflict resolution options for selection, resolving the conflict based on the conflict resolution selection options, displaying a user interface that includes sections of the content item, sources used for editing, editing options, other sections affected in the content item when one section is edited, and conflict identification and resolution options, and performing all the functions, steps, features, discussed herein. Control circuitry 220 and/or control circuitry 218 are also configured to perform all processes described and shown in connection with FIGS. 1, 5, 8, 12, and 17-18.

Computing device 218 receives a user input 204 at input circuitry 216. For example, computing device 218 may receive a user input like 710, 730, and/or 740 in FIG. 7, which may be a request to generate a long form content item.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, 5G (or 6G which is in development) or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, 5G (or 6G which is in development), or other wireless transmission protocols.

Processing circuitry 240 may receive input 204 from input circuit 216. Processing circuitry 240 may convert or translate the received user input 204 that may be in the form of voice input into a microphone. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 5, 8, 12, and 17-18, respectively.

FIG. 2B is a block diagram of an example of an electronic device or user device for generating, editing, and rewriting a long form business content item, in accordance with some embodiments of the disclosure. FIG. 2B is also used to generate semantic graph(s), generate a long form business content item using private enterprise data, detect user connections with data sources, such as private enterprise data sources connected via login, access data sources connected by the user devices, organize data sources on a user interface, such as by topic, genre, category of enterprise function (e.g., sales, accounting, HR, ticketing, etc.), generate a sematic graph for the data/data items accessed from the data sources, performing initial and subsequent synchronization of data between semantic graph, data pipelines, and data sources to ensure any changes in data are updated, generate associations between data items accessed from the data sources in the semantic graph, indexing data items in the semantic graphs where the indexes point to the data source at which each data item is stored, receive user input on the type of content item, such as a long form business content item to be generated, which includes but is not limited to documents, excel or other related computational files, presentations, slides, guides, etc., receive user input from the system, such as based on AI or ML recommendations, on the type of content item, such as a long form business content item to be generated, generating a template based on the user or system input received, the template being a table of contents in some embodiments, performing a search query for each of the nodes, sections, sub-sections, leaves of the template, determining the most fine-grained node, section, sub-section, leaf of the template, determining the most fine-grained node, section, sub-section, leaf of a particular section in the template, starting the search query with the determined most fine-grained node, section, sub-section, leaf of the template or a section within the template, searching the semantic graph for data items that are relevant to the search query, e.g., to the most fine-grained node, section, sub-section, leaf of the template, obtaining relevant data items based on the search query, such from the data sourced indexed in the semantic graph, performing a write operation in the template in the most fine-grained node, section, sub-section, leaf of the template, for which the search query was conducted, repeating the search queries for all sections, sub-sections, modes, leaves in the template until all sections and subsections are completed, parallel processing and simultaneously searching and writing to sections and sub-sections that are on a same layer/level, determining identity of the user, including determining user job titles and designations, user access to data sources, including which data sources are authorized to be accessed by the user, determining enterprise identify, customizing the templates and semantic graphs based on user identity, enterprise identity, or both, publishing the final content or section by section as it is written to a user interface of a user device, providing feedback and editing capabilities, the provided editing and feedback capabilities including allowing feedback using a per layer, section-by-section, or layer-by-layer approach, highlighting sections for feedback, dynamically updating the section and any other related sections based on the feedback, updating semantic graphs based on the feedback, receiving one or more sources that are to be used in editing an identified section of the content item, receiving one or more different sources that are to be used in editing multiple sections of the content item, accessing and indexing the raw data from the identified one or more sources, indexing using various techniques including using an LLM, identifying relevant data from the indexed raw data, using an LLM to generate queries to the indexed raw data for identifying data that is relevant to the identified text, the queries being formulated by the LLM based on the identified text, using the narrow set of relevant data that results after the querying to rewrite and/or regenerate the identified section, where the rewrite and regenerate is performed using relevant data from the identified one or more sources, determining coherency of other sections, subsections, pages of the content item with the rewritten and regenerated identified text, when incoherency with the rewritten and regenerated identified text is determined, rewriting and regenerating the sections, subsections, pages of the content item such that they are coherent with the rewritten and regenerated identified text, determining which source to use or how to prioritize or weight the source when more than one source is provided for editing the identified text, using a plurality of factors to weight the source when more than one source is provided, displaying editing options, receiving a selection of editing options which include a selection of a portion, section, sub-section of the content item, to be edited, rewritten, and regenerated to be coherent with the edited text, determining conflicts caused in other sections of the content item when one section of the content item is edited using a provided source, providing various conflict resolution options for selection, resolving the conflict based on the conflict resolution selection options, displaying a user interface that includes sections of the content item, sources used for editing, editing options, other sections affected in the content item when one section is edited, and conflict identification and resolution options, and performing all the functions, steps, features, discussed herein.

In an embodiment, the equipment device 300, is the same equipment device 202 of FIG. 2A. The equipment device 300 may receive content and data via input/output (I/O) path 302. The I/O path 302 may provide audio content and data to control circuitry 304, which includes processing circuitry 306 and storage 308. The control circuitry 304 may be used to send and receive commands, requests, and other suitable data using the I/O path 302. The I/O path 302 may connect the control circuitry 304 (and specifically the processing circuitry 306) to one or more communications paths. I/O functions may be provided by one or more of these communications paths but are shown as a single path in FIG. 2B to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 or Nvidia processors) or multiple different processors (e.g., an Intel Core i5, i7, 19 processor, Nvidia GH 100, 200).

The processes as described herein may be implemented in or supported by any suitable software, hardware, or combination thereof. They may also be implemented on user equipment, on remote servers, or across both.

In client-server-based embodiments, the control circuitry 304 may include communications circuitry suitable to generate semantic graph(s), generate a long form business content item using private enterprise data, detect user connections with data sources, such as private enterprise data sources connected via login, access data sources connected by the user devices, organize data sources on a user interface, such as by topic, genre, category of enterprise function (e.g., sales, accounting, HR, ticketing, etc.), generate a sematic graph for the data/data items accessed from the data sources, performing initial and subsequent synchronization of data between semantic graph, data pipelines, and data sources to ensure any changes in data are updated, generate associations between data items accessed from the data sources in the semantic graph, indexing data items in the semantic graphs where the indexes point to the data source at which each data item is stored, receive user input on the type of content item, such as a long form business content item to be generated, which includes but is not limited to documents, excel or other related computational files, presentations, slides, guides, etc., receive user input from the system, such as based on AI or ML recommendations, on the type of content item, such as a long form business content item to be generated, generating a template based on the user or system input received, the template being a table of contents in some embodiments, performing a search query for each of the nodes, sections, sub-sections, leaves of the template, determining the most fine-grained node, section, sub-section, leaf of the template, determining the most fine-grained node, section, sub-section, leaf of a particular section in the template, starting the search query with the determined most fine-grained node, section, sub-section, leaf of the template or a section within the template, searching the semantic graph for data items that are relevant to the search query, e.g., to the most fine-grained node, section, sub-section, leaf of the template, obtaining relevant data items based on the search query, such from the data sourced indexed in the semantic graph, performing a write operation in the template in the most fine-grained node, section, sub-section, leaf of the template, for which the search query was conducted, repeating the search queries for all sections, sub-sections, modes, leaves in the template until all sections and subsections are completed, parallel processing and simultaneously searching and writing to sections and subsections that are on a same layer/level, determining identity of the user, including determining user job titles and designations, user access to data sources, including which data sources are authorized to be accessed by the user, determining enterprise identify, customizing the templates and semantic graphs based on user identity, enterprise identity, or both, publishing the final content or section by section as it is written to a user interface of a user device, providing feedback and editing capabilities, the provided editing and feedback capabilities including allowing feedback using a per layer, section-by-section, or layer-by-layer approach, highlighting sections for feedback, dynamically updating the section and any other related sections based on the feedback, updating semantic graphs based on the feedback, receiving one or more sources that are to be used in editing an identified section of the content item, receiving one or more different sources that are to be used in editing multiple sections of the content item, accessing and indexing the raw data from the identified one or more sources, indexing using various techniques including using an LLM, identifying relevant data from the indexed raw data, using an LLM to generate queries to the indexed raw data for identifying data that is relevant to the identified text, the queries being formulated by the LLM based on the identified text, using the narrow set of relevant data that results after the querying to rewrite and/or regenerate the identified section, where the rewrite and regenerate is performed using relevant data from the identified one or more sources, determining coherency of other sections, subsections, pages of the content item with the rewritten and regenerated identified text, when incoherency with the rewritten and regenerated identified text is determined, rewriting and regenerating the sections, subsections, pages of the content item such that they are coherent with the rewritten and regenerated identified text, determining which source to use or how to prioritize or weight the source when more than one source is provided for editing the identified text, using a plurality of factors to weight the source when more than one source is provided, displaying editing options, receiving a selection of editing options which include a selection of a portion, section, sub-section of the content item, to be edited, rewritten, and regenerated to be coherent with the edited text, determining conflicts caused in other sections of the content item when one section of the content item is edited using a provided source, providing various conflict resolution options for selection, resolving the conflict based on the conflict resolution selection options, displaying a user interface that includes sections of the content item, sources used for editing, editing options, other sections affected in the content item when one section is edited, and conflict identification and resolution options, and performing all the functions, steps, features, discussed herein. The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of electronic equipment devices, or communication of electronic equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, or any other suitable fixed or removable storage devices, and/or any combination of the same. The storage 308 may be used to store user login and connections with various data sources, templates, including all sections in the templates, hierarchy or sections and nodes in the template, semantic graphs and updates to semantic graphs, data sources organization structure, such as by genre, data indexed in semantic graphs, association between data items listed in the semantic graphs, data written into a section, feedback received, identity of person and their access authorizations and permissions, person's tasks and agenda, input from user or system as to type of content item to create, data related to employee job titles and designations, sources identified for use in editing identified text, weighting scores associated with the sources, identification of which sections became incoherent due to editing of one of the sections of the content item using the identified source, selection of editing options, indexing of raw data associated with the identified source, search queries to the index containing raw data, narrowed set of data relevant to the identified text that is obtained based on the queries to the indexed data and NLP, ML, and AI algorithms. Cloud-based storage, described in relation to FIG. 2B, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The electronic device 300 may include an interface 310. The interface 310 may be any suitable user interface, such as a remote control, mouse, trackball, keypad, keyboard, touch screen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 2B can be implemented in system 200 of FIG. 2A as electronic equipment device 202, but any other type of user equipment suitable for allowing communications between two separate user devices for performing the functions related to implementing machine learning (ML) and artificial intelligence (AI) algorithms, and all the functionalities discussed associated with the figures mentioned in this application The electronic device 300 of any other type of suitable user equipment may also be used to implement ML and AI algorithms, and related functions and processes as described herein. Various network configurations of devices may be implemented and are discussed in more detail below.

Figure 3:
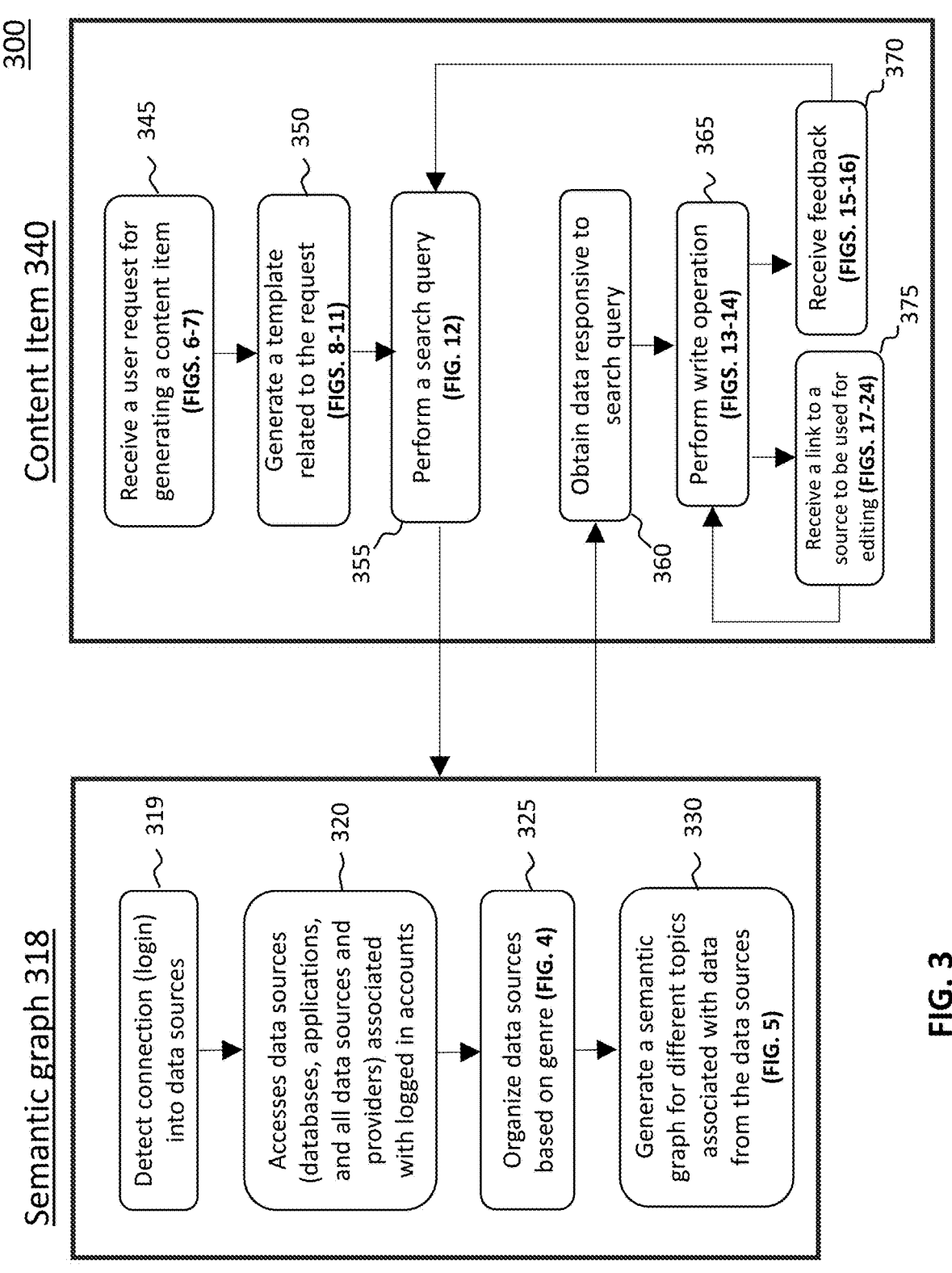
FIG. 3 is a flowchart of an example of a process for generating a long form business content item using private enterprise data, in accordance with some embodiments of the disclosure.

Turning now to figures, FIG. 3 is a flowchart of an example of a process 300 for generating a long form business content item using private enterprise data, in accordance with some embodiments of the disclosure. Process 300, as depicted in FIG. 3, may be implemented, in whole or in part, by systems or devices such as those shown in FIGS. 2-3. One or more actions of the process 300 may be incorporated into or combined with one or more actions of any other process or embodiments described herein. The process 300 may be saved to a memory or storage (e.g., any one of those depicted in FIGS. 2-3) as one or more instructions or routines that may be executed by a corresponding device or system to implement the method 300.

In some embodiments, block 318 relates to a semantic graph and block 340 relates to a long form business content item generated by using the LLM leveraged semantic graph 318. The semantic graph 318, in some embodiments, represents data (also referred to herein as data items) from a plurality of data sources that are private to an enterprise. The semantic graph 318 may index the data from the data sources and when queried, the responsive data that is indexed in the semantic graph may be made available if the user is authorized to access such data. In some embodiments, the semantic graph 318 may be generated prior to receiving or processing a request from a user interface to generate a long form business content item. In other embodiments, the semantic graph 318 and content item 340 may also be generated during or after receiving or processing a request from a user interface to generate a long form business content item. Additional details relating to the semantic graph 318, including its creation use are described further below.

At block 319, the control circuitry, such as the control circuitry 220 and/or 228 of FIG. 2A, may detect a connection, such as a login, into one or more databases or data sources. The user may be logging into these data sources using a user interface on their user device. For example, a user may be logging in into their accounting applications, HR applications, ticketing applications, E-mail, Sales applications, or to their text messaging applications. The user may also be logging in to a database, library, or some other repository where documents that are authorized for user access are stored. When the user logs in, the system may automatically detect which databases, data sources, applications to which the user has logged in.

Figure 4:
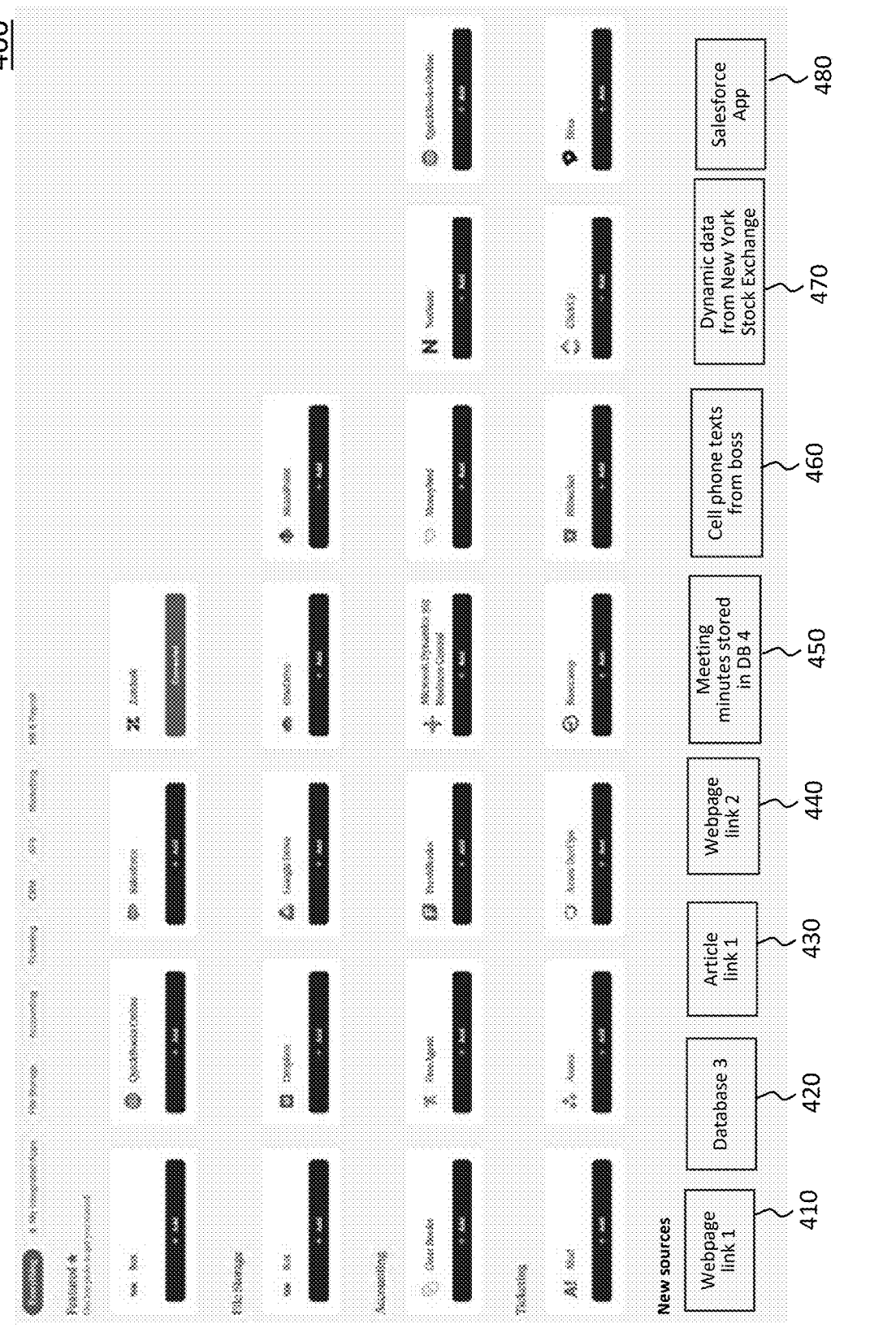
FIG. 4 is a block diagram of an example of private enterprise data organized by genre, topic, or any desired category, in accordance with some embodiments of the disclosure.

At block 320, in one embodiment, the control circuitry 220 and/or 228 may access all the data sources to which the user has logged in and organize them, such as based on their genre, topic, or some other desired category. One example of such an organization is depicted in FIG. 4. As depicted, some examples of genres may include file storage, accounting, ticketing, sales, marketing, engineering, text, and e-mail. Although one example of organizing data sources is provided and described at block 325, the embodiments are not so limited and other types of organizing, grouping, and clustering of data sources is also contemplated. At block 320, in another embodiment, the control circuitry 220 and/or 228 may access all the data sources to which the user has authorized access to, i.e. permitted to login to, and even if the user has not actually logged into such data sources, as long as the user is authorized and permitted to access data from them, such data sources may also be used and the control circuitry 220 and/or 228 may organize them, such as based on their genre or some other topic.

At block 330, the control circuitry 220 and/or 228 may generate a semantic graph. The semantic graph may be organized, such as by topic, genre, file association, department association, etc., for all data/data items accessed by the control circuitry from different data sources to which the user device is authorized access. The organization, which may be topical, may include organizing data relevant to a topic from different data sources together. For example, data relevant to an employee handbook, a request for proposal (RFP), company's financial data, company's products may be grouped together. The semantic graph may semantically associate all topics, words, phrases, and content that are related to each other. The semantic graph, in some embodiments, may be organized and generated by an LLM. The LLM may establish the semantic relationships between data items from different data sources.

The generated semantic graph may only include data that is authorized to be accessed by a user for whom it is generated to be used. If a user is able to log in to a database, application, or another document repository, the user likely has access to data that is stored in the accessed database, application, or document repository. If the user was not authorized to access such data, the user likely would not be provided login credentials to be able to log in to such databases, applications, or document repositories that stores such data. As such, only data from those databases, applications, or document repositories to which the user can log in, or is authorized to log in, may be used by the control circuitry 220 and/or 228 to generate the semantic graph. Since the control circuitry 220 and/or 228 may monitor user login and also user login history, such as from using machine learning techniques, the control circuitry 220 and/or 228 may, without any user intervention, use data from such databases, applications, or document repositories to generate the semantic graph. Additional details relating to generating a semantic graph are described below in the description related to FIG. 5.

Block 340 refers to a content item that may be generated using blocks 345-370 and leveraging the semantic graph. At block 345, the control circuitry 220 and/or 228 receives a user request for generating a content item. This may be a large/long form business content item such as a document or presentation using private enterprise data/data items. The request may also be for generating any type of content item, such as a Word™, Excel™, PowerPoint™, Google Docs™, Scrivener™, Pages™, PDFs, Evernote™, QuickBooks™ or any other type of document, file, personal or business document or presentation.

In one embodiment, the request to generate a content item, such as a large business document or presentation using private enterprise data, as depicted in FIG. 6, may be received from a user or suggested to the user by the control circuitry 220 and/or 228. For example, the control circuitry 220 and/or 228 monitoring the user history, job function, tasks for the day, work assignments, meeting minutes, user communications, etc., may determine what projects and tasks are to be performed by the user. Based on such knowledge, which may also be obtained from machine learning, the control circuitry 220 and/or 228 may suggest the type of documents and presentations to the user device for generation. The control circuitry 220 and/or 228 may provide the recommendation for the user's selection and if selected may receive the selection at block 345 and perform the next steps in FIG. 3. In another example, as depicted in FIG. 7, the user may provide details of the type of long form business content item to be generated.

At block 350, once the request to generate a content item is received, whether by the user or suggested to the user for selection and then received, the control circuitry 220 and/or 228 may generate a template based on the received request. The template may include a hierarchy of sections or nodes in a document or a presentation. Some of the sections in the template may have multiple subsections and others may not. Which sections to create and how many layers of subsections to create for each topic in the template may be based on the type of document to be generated and user or system input. It may also be directed by an LLM suggestion provided. In some embodiments, the template may be received from a user interface of an electronic device associated with a user. In other embodiments, the template may be generated by the control circuitry 220 and/or 228 by querying the user interface associated with the user. The query may ask for certain information that may allow the control circuitry 220 and/or 228 to determine which type of template is to be generated. The control circuitry 220 and/or 228 may also display on the user interface of a user device associated with the user, various sections that can be used to upload documents that may assist the control circuitry 220 and/or 228 in determining which type of template to generate. In some embodiments, the process to generate a template is described further in FIGS. 8-11.

Figure 10:
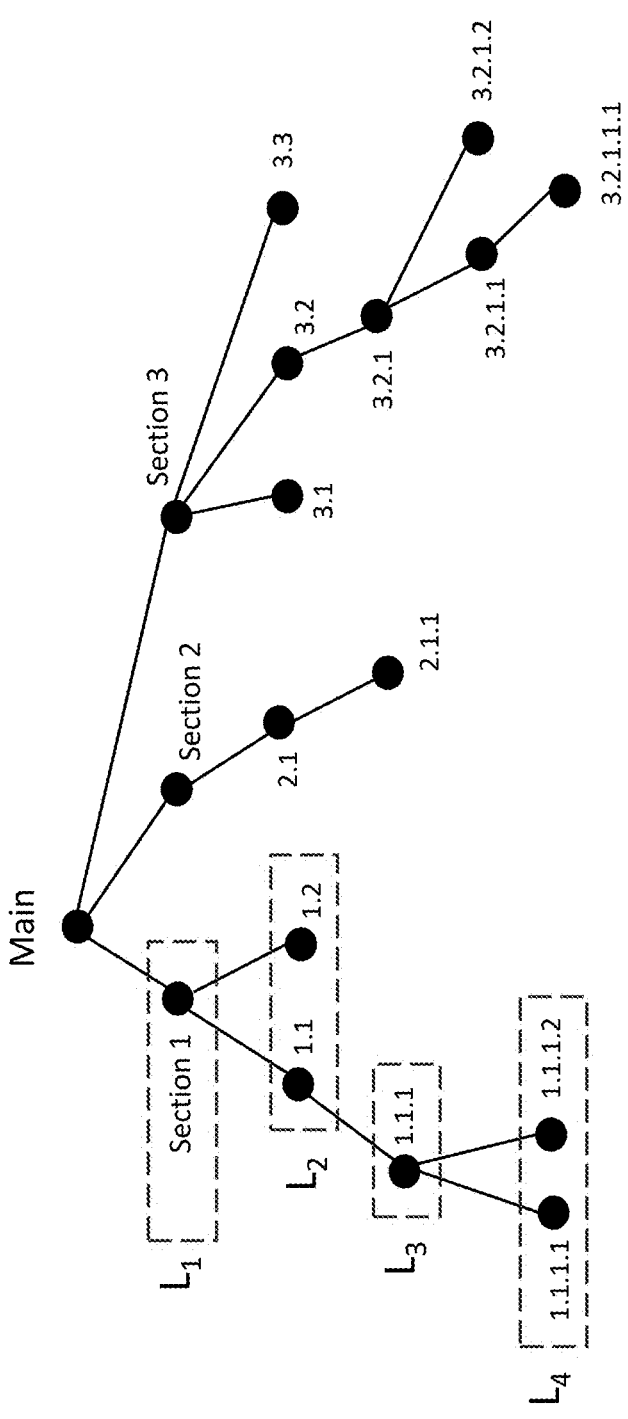
FIG. 10 is an example of layers or tiers of sections and their hierarchy in the generated template, in accordance with some embodiments of the disclosure.

The generated template, as described earlier, may include sections and layers of subsections for each section. Some sections may have one layer (subsection), some may have several layers of nested subsections while others may not have any subsections at all. It may depend on the nature, type, context of the content item to be generated. It may also depend on the recommendation obtained from an LLM. Some examples of the nested forest and trees of sections and layers of subsections are depicted in FIGS. 10 and 11.

At block 355, a search query may be performed by the control circuitry 220 and/or 228 to the semantic graph to identify, access, and obtain content that can be populated in the generated template. In some embodiments, the search query may be performed for each section in the template. The querying process may start with the deepest nested leaf, which may also be referred to as the bottom most nested layer in all the sections (or a particular section), or the most fine-grained subsection. For example, if a document has two sections, Section 1 and Section 2, and Section 2 has the following nested subsections, 2.1, 2.2, and 2.1.1, then section 2.1.1 may be the deepest nested leaf/bottom most nested layer/most fine-grained subsection. As such, the first query may be for such a deepest nested leaf/bottom most nested layer/most fine-grained subsection. The query may be to the generated semantic graph for identifying and determining content relevant to the deepest subsection. In some embodiments, an LLM may match the query to indexed data items in the semantic graph and suggest which indexed data is to be obtained and populated in the section for which the query was conducted.

At block 360, data in response to the query made may be obtained by the control circuitry 220 and/or 228. In some embodiments, the query to the semantic graph may result in the pointing to the data indexed at the data source where it is stored. If the user device querying such data has the allotted permissions and authorizations to obtain such data, then such data may be obtained at block 360 and be made available to a generation model (e.g., an LLM model) to perform a write operation at block 365.

Figure 13:
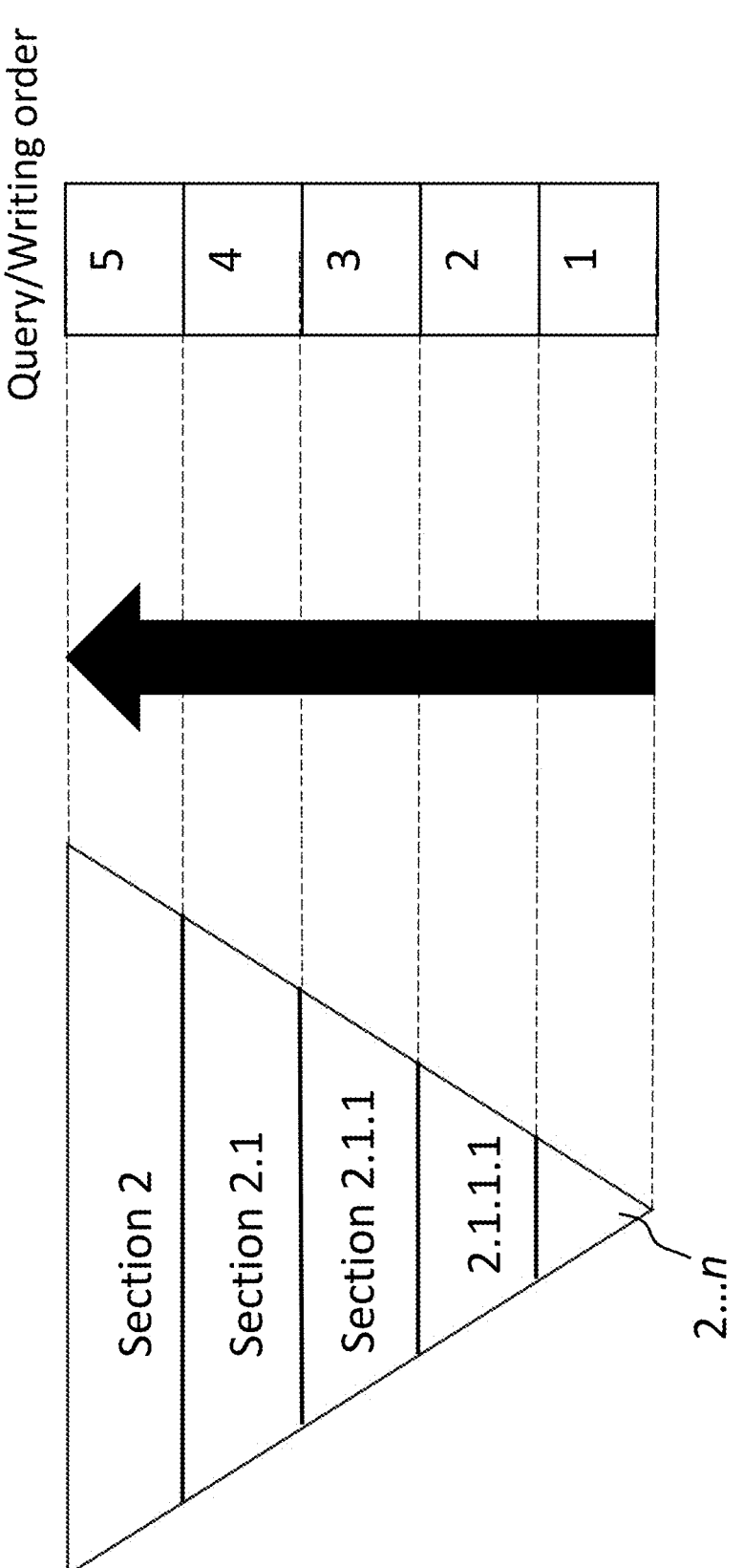
FIG. 13 is an example of a bottoms up approach in writing content into the generated template, in accordance with some embodiments of the disclosure.
Figure 14:
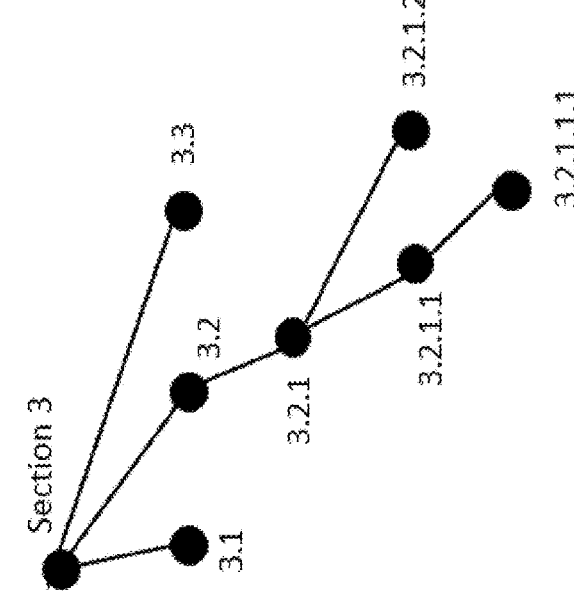
FIG. 14 is an example of a querying and writing order based on section hierarchy for writing content into the generated template, in accordance with some embodiments of the disclosure.

At block 365, a write operation may be performed to write the obtained data into the deepest or most fine-grained subsection. How to use the obtained data and write a logical and coherent section may be based on recommendations from an LLM model. The order of writing into the template may be based on the hierarchy of the sections, as described above with respect to the query. Some examples of the order of write operation, which mirrors the order of query, is depicted in FIGS. 13 and 14.

Once a write operation is performed, the user may provide any feedback at block 370. In some embodiments, a per-layer feedback may be provided by the user. Each per-layer feedback may result in regeneration of the subsection (or section) for which the feedback was provided as well as any other section or subsections in the template that refer to the regenerated section or depend on the regenerated section in any form. As such, all other sections may maintain data consistency for any change performed to the section for which feedback was provided.

The process of providing feedback may include highlighting the section or subsection for which feedback is to be provided. The highlighting may be automatic if the user's mouse, trackpad, finger, touchscreen cursor, or another type of cursor hovers over the section or subsection. The highlighting for editing and providing feedback may visually distinguish the section or subsection from other sections and subsections for which feedback is not being currently provided. If a section or subsection is hovered upon, selected, or highlighted, then the control circuitry 220 and/or 228, in some embodiments, may automatically provide editing suggestions. In some embodiments, the automatically provided editing suggestions may be based on determining user's preferences, prior edits, and patterns using machine learning techniques. In other embodiments, the automatically provided editing suggestions may also be based on preferences of other colleagues or the enterprise accepted policies. Some examples of such editing suggestions are provided in FIGS. 15 and 16.

The process from blocks 355 to 370 may be repeated for all sections and subsections in the template until all sections and subsections in the template are written. When multiple sections are in the same layer, parallel processing may be performed in real time (barring any network latency) to simultaneously write multiple sections on the same layer at the same time.

In some embodiments, a source may be identified at block 375 that is to be used for editing any one or more of the written section or subsections. Block 375 may be implemented instead of, or in addition to, block 370. Additional details of the editing process that includes using an identified source is described below in relation to FIGS. 17-24.

FIG. 4 is a block diagram of an example of private enterprise data organized by genre, topic, or any desired category, in accordance with some embodiments of the disclosure. In some embodiments, a user may connect, such as by logging in, to a plurality of databases, files, libraries, and applications. For example, the user may connect to their accounting applications, HR applications, ticketing applications, E-mail, sales applications, or to their text messaging applications. The user may also connect to any other system within the enterprise that holds private enterprise data. As depicted in FIG. 4, in one embodiment, the user may have connected to applications such as Box, QuickBooks Online, Salesforce, Zendex, Dropbox, Google Drive, Free Agent, FreshBooks, Work Day, Asana, and NetSuite. The user may have also connected to their email (both work and personal) and their text messaging applications, such as WhatsApp, Facebook messenger, or other communications applications such as Slack.

In one embodiment, when the user connects to any such databases and applications, the control circuitry 220 and/or 228 may automatically access all such applications. The control circuitry 220 and/or 228 may then obtain data from the accessed databases and applications and generate a semantic graph that provides associations and relationships between all the data obtained. In some embodiments, the process of obtaining data may also involve obtaining file file-names, metadata, timestamps. It may also involve getting file names from previous conversations, such as conversation mentioned in emails or text from the user device, since the system is provided access to all communications, or in some embodiments only enterprise related communications like company email, from where such files names and associated data sources may be identified. In some embodiments, the control circuitry 220 and/or 228, instead of obtaining the data, may analyze the data to generate the semantic graph and index the semantic graph such that the indexed data can be obtained as needed, such as when queried.

In another embodiment, the control circuitry 220 and/or 228 may determine which data sources are authorized/permitted for the user device to connect to, such as via logging in. Even if the user has not actually logged into such data sources, as long as the user device is authorized and permitted to access data from them, such data sources may also be used by the control circuitry 220 and/or 228 to aces or obtain data from the accessed databases and applications and generate a semantic graph that provides associations and relationships between all the data accesses and/or obtained.

In other embodiments, the control circuitry 220 and/or 228 may suggest to the user to connect to a certain account or application based on the type of content item that is to be created. For example, control circuitry 220 and/or 228 may determine that a request for proposal (RFP) is to be created by the user. The control circuitry 220 and/or 228 may make such a determination based on emails received by the user from a colleague or their boss. The control circuitry 220 and/or 228 may also crawl a plurality of enterprise and private communication tools and databases and analyze user communications and tasks (e.g., emails, text, Slack messages, meeting minutes, etc.) to determine what task is to be performed by the user device. The control circuitry 220 and/or 228 may also determine that data that may be relevant to the task is stored in a particular database or application that the user is authorized to access. Accordingly, the control circuitry 220 and/or 228 may suggest the user to connect (e.g., log in) to the particular database or application that stores the data that may be relevant to the task. In another embodiment, if the control circuitry 220 and/or 228 determines that the user device is authorized to access the particular database or application that stored the data that may be relevant to the task, then the control circuitry 220 and/or 228 may automatically access and/or obtain the data from the particular database or application regardless of whether the user connects to it.

In some embodiments, the control circuitry 220 and/or 228 may display all the accounts or databases to which the user has authorized access on a user interface of an electronic device used by the user as depicted in FIG. 4. The control circuitry 220 and/or 228 may also generate headers and titles for different categories under which the access to the different applications and databases may be listed. The control circuitry 220 and/or 228 may leverage an LLM to determine the headers and titles for the groups of application icons clustered together in a group. The display on the user interface may be organized by genre, such as by the topic or category of the application, such as all ticketing applications may be displayed under a ticketing header.

In addition to the databases, files, libraries, and applications, such as accounting applications, HR applications, ticketing applications, E-mail, sales applications, automatically used by the system based on the user connecting to them via login or having authorized access to them, the user may also identify additional data sources, such as data sources 410-480, which have not been used in generating the semantic graph. The user may identify these sources 410-480 to be used in generating the content item or may place them in the library for them to be used in the editing phase, e.g., as described in block 150 of FIG. 1 or in more detail in the description related to FIGS. 17-24.

Figure 5:
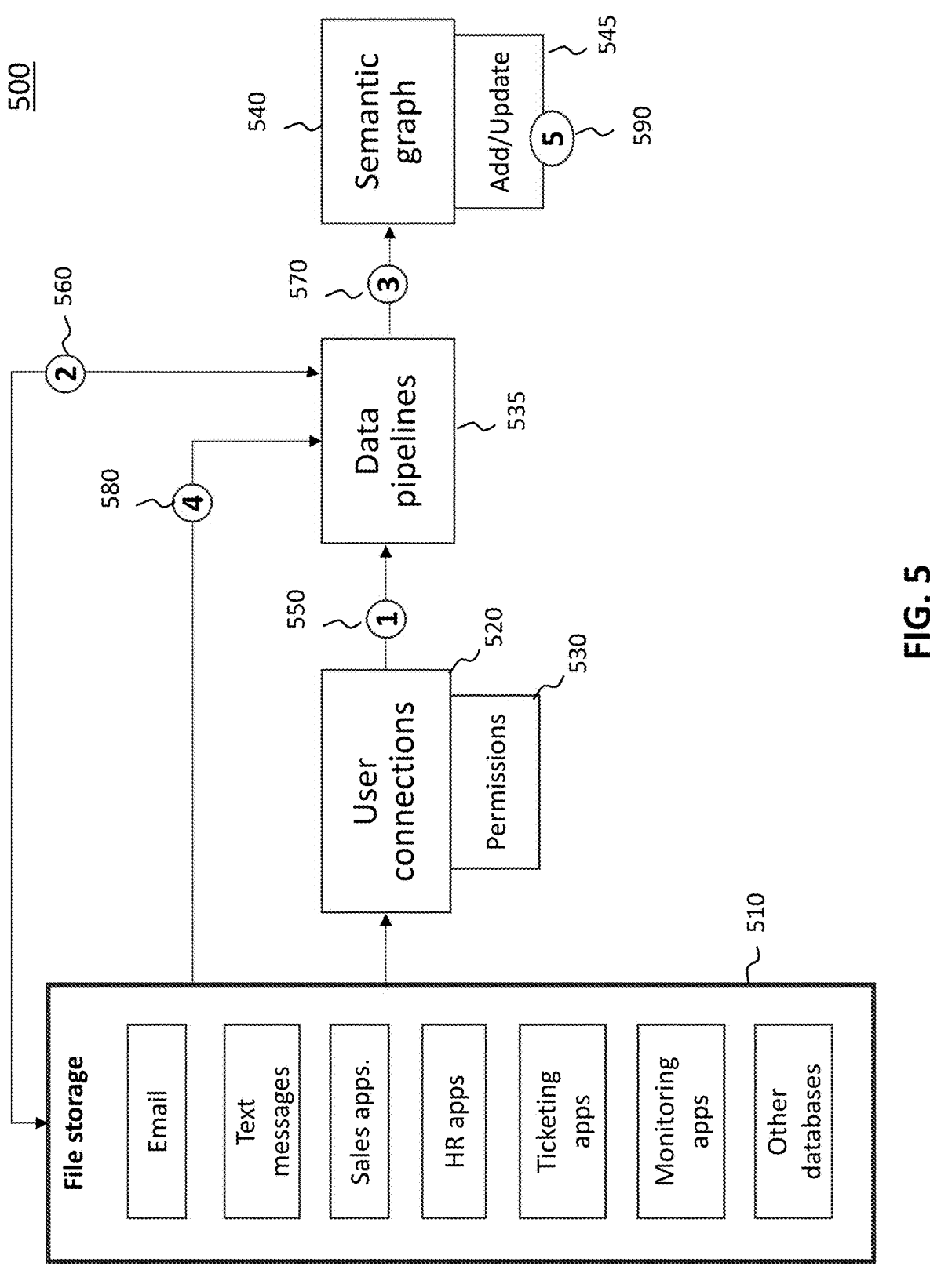
FIG. 5 is flowchart of an example of a process for generating a semantic graph that represents data from data sources and file storage, in accordance with some embodiments of the disclosure.

FIG. 5 is flowchart of an example of a process 500 for generating a semantic graph that represents data from data sources and file storage, in accordance with some embodiments of the disclosure. Process 500, in some embodiments, may be implemented, in whole or in part, by systems or devices such as those shown in FIGS. 2-3. One or more actions of the process 500 may be incorporated into or combined with one or more actions of any other process or embodiments described herein. The process 500 may be saved to a memory or storage (e.g., any one of those depicted in FIGS. 2-3) as one or more instructions or routines that may be executed by a corresponding device or system to implement the method 500.

In some embodiments, the components of the process may include a file storage 510, user connections 520, permissions 530, data pipelines 535, semantic graph 540, and updating or adding to the semantic graph 545.

In some embodiments, the process 500 may be initiated when a user 520 connects to a file storage 510. In other words, the process may be initiated when a user logs in to any of the databases or applications to which they have authorized access. In some embodiments, the control circuitry 220 and/or 228 may check for permissions and authorizations to ensure that the user can access all the data in the file storage. For example, there may be instances where the user is authorized to access a portion of the database and not all of the files in the database. This may be because certain private data in the database may either require another password or higher level of access to which the user is not authorized. As such, the control circuitry 220 and/or 228 may determine permissions 530 for each application and database to which the user connects to ensure that only data that is authorized to be accessible by the user can be used in generating the semantic graph.

Once the user connection and permissions have been evaluated, a plurality of data pipelines 535 are triggered. These data pipelines 535 are triggered for each connection/login. For example, if a user logs into the sales application, the associated data pipeline may be triggered. Likewise, if the user logs into a ticketing application, another associated data pipeline may be triggered. Accordingly, for each application connected, a separate data pipeline may be triggered. In some embodiments, all the separate data pipelines may be collectively aggregated into a larger data pipeline. In an alternative embodiment, a single data pipeline, instead of separate data pipelines, may be used to manage the flow of data and updates. In another embodiment, once it is determined that the user has authorized access to the data items from the plurality of data sources, regardless of whether the user connects to them, as long as the user is permitted and authorized access, the plurality of data pipelines 535 may be triggered.

The data pipelines 535 may be used to perform an initial sync of data with the associated file storage. In this initial sync, the data pipelines may query the file storage to provide all the file data. Subsequently after the initial sync, if any of the applications has an update, or any of the data items from any of the data sources are updated, deleted, or added, then such asynchronous updates, deletion, and additions may be provided to the data pipelines in real time, subject to any network latency. The update may be, for example, a portion of an application, a portion of data, a table, a comment, etc. It may be a small update or large update where a lot of data is changed. When the update is to a portion of the data in an application, then only the portion that has changed in the application may be changed in the semantic graph. Such updates by portions, segments, or even to even small pieces of data, such as a table, being made only to the relevant portion in the semantic graph may save computing resources that would otherwise be required to regenerate the entire data. In some embodiments, when a data item in any of the applications or database in the file storage 510 goes through a change, the change is transmitted at 580 to the data pipelines, such as the data pipeline associated with the application which underwent the data change. The data is then resynchronized and any related update is made to the semantic graph. In some embodiments, if multiple queries are done for the same sub-section, the system may add cache for search results for the same query and perform filtering such that they can be used in a subsequent query.

In one example, after the initial synchronization of data via steps 550 and 560, a semantic graph may be created. If any data is changed, such as in the ticketing application (or any other application to which the user has connected), or new data is added (e.g., a new document in HR policy), such asynchronous update in the data may be transmitted to the data pipelines at step 580. The data pipeline may then process and transmit the change to update the semantic graph at 590. As described earlier, only data that is changed in the application will be updated on the semantic graph. If that data is used in multiple places in the semantic graph, or if other data depends on the changed data, then all data that relies on the data that is changed may also be changed for consistency. The control circuitry 220 and/or 228 may understand exactly where the change in data affects the semantic graph and accordingly make the updates to the semantic graph with the newly updated data.

In some embodiments, the process of FIG. 5 may also include, in addition to or in lieu of the process described, extracting a token from the query, such as the query for each sub-section or paragraph to the semantic graph. This may be performed for identifying data contract and web search policy concepts in the query or to identify name entity recognition (NER), such as that of the user or the enterprise. The process may also include performing a metadata search, this may be to get all data contract file names (all files uploaded in the data sources). The system may then identify documents uploaded. It may use backend logic to understand how to query these documents and which documents are uploaded. It may tag these documents and use the tags as needed. The system may perform post-processing rules to transform and extract rules into a standardized format. It may obtain relevant documents for rules and docs being validated. It may use vertex-based retrieval of relevant documents based on tokens identified in the queries. It may then validate rules with the documents being validated, such as by performing an LLM call.

When documents are uploaded by a user in connection with requesting a long form content item, such as an RFP or another type of document that the user would like the system to use as input in generating a template, then, in some embodiments, the system may use hardcoded URLs of documents to get RFP overview and structured requirement documents. It may then use prompts to create templates hardcoded for the RFP to be created, e.g. "Company XYZ RFP." The system may then generate a template and query the semantic graph sequentially based on sections of template, such as by using the bottoms up approach described herein. The system may create search queries based on RFP and structured requirement documents. It may use the search queries in the pinecone databases in-memory index. It may get the search response and use LLM to format the response and then concatenate the responses generated.

Figure 9:
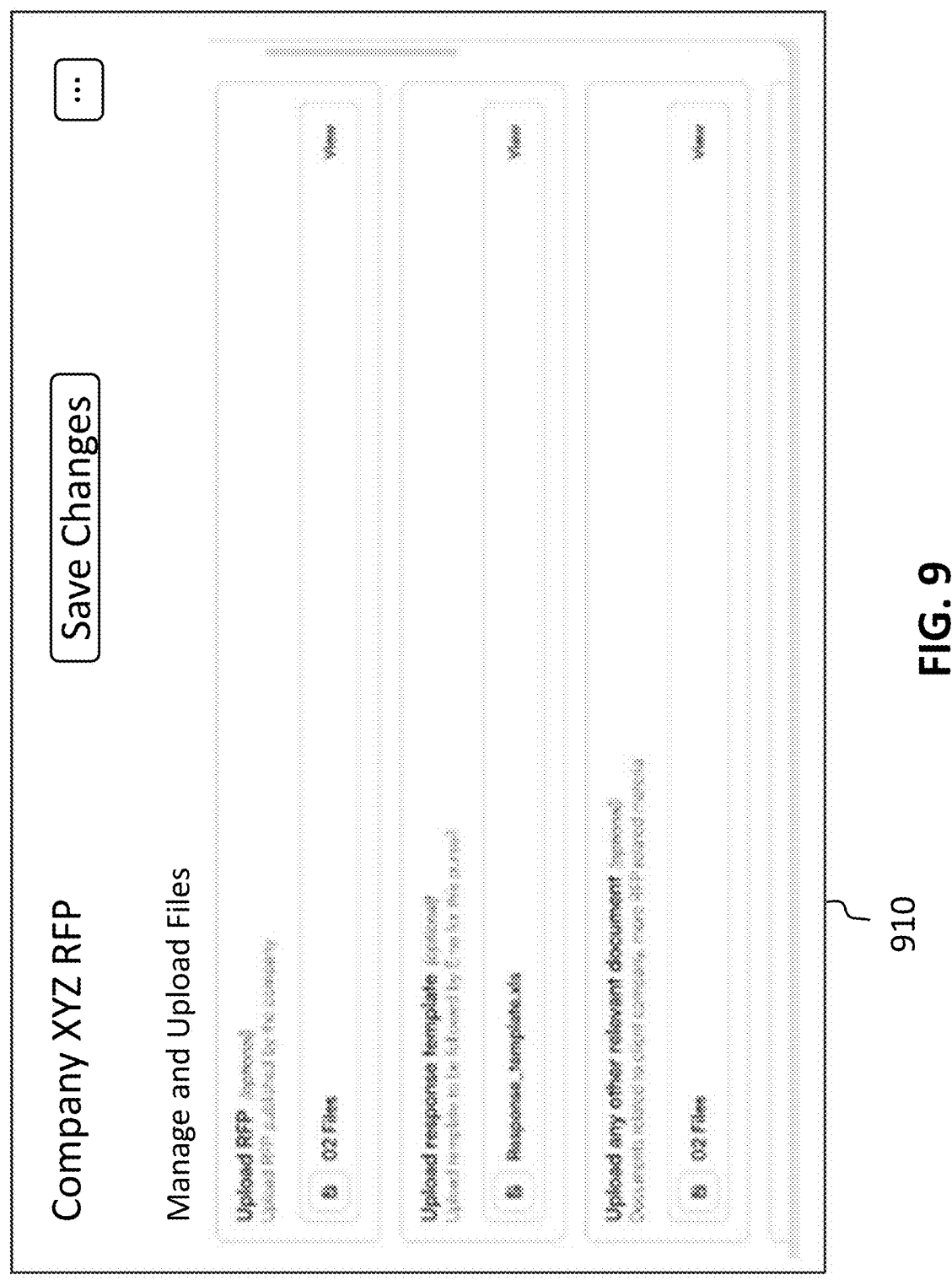
FIG. 9 is an example of a user interface for providing information that may be used to generate the template, in accordance with some embodiments of the disclosure.

FIG. 6 is a block diagram of user requests and suggested user requests for generating a long form business content item, in accordance with some embodiments of the disclosure. Referring to block 145 of FIG. 1, the process to generate a large business document or presentation using private enterprise data may be originated by a user, as depicted at 610, or by the system 620, such as the system in FIG. 2A. When the request is originated by the user, the user, via their user interface, may provide any type of details relating to the type of document, style of the document, context of the document, etc. In other embodiments, in their request, the user may provide a high-level framework of the type of document to generate. Some examples of the type of user requests are provided in FIG. 7. For example, the user may request, as depicted at 710 in FIG. 7, "Can you generate a proposal document which tells about the Enhancing Healthcare Through Collaborative Innovation: A Comprehensive IT and Business Services Proposal for Health Inc." In another example, the user may request, as depicted at 730 in FIG. 7, "Can you create an employee handbook for our company ABC, Inc. Make sure it includes sections on vacations, benefits, and topics that concern our company." In yet another example, the user may request, as depicted at 740 in FIG. 7, "Can you generate a presentation for a marketing pitch to XYZ Corp and make sure it is thorough and highlights our major achievement." The control circuitry 220 and/or 228, in some embodiments, also ask follow up questions or request documents to be uploaded to further understand the scope of the request, one such example of a user interface generated by the control circuitry 220 and/or 228 for the follow-up is depicted at FIG. 9.

In some embodiments, the user's request may specify which documents to use for certain sections of the content item. For example, as depicted at 750, the user may provide website link 1 to be used in generating a section on trends and document ABC from database X in generating the section on projections. As such, guidance may be provided for the entire content item or for specific sections of the content item by the user via the user interface of their user device.

In another embodiment, the request to generate a content item, such as a large business document or presentation using private enterprise data, may be originated by the system, as depicted at 620. In this embodiment, the control circuitry 220 and/or 228 may monitor the user's communications, user's tasks, action items from meeting minutes, or a voice message received by the user from in their voice-mail. Since the control circuitry 220 and/or 228 may have access, or be provided access, to all such data communications and sources, it may use an LLM to input the data received and determine what documents, presentations, and content items are to be generated by the user. The control circuitry 220 and/or 228 may also leverage machine learning data 630 to determine user patterns and what documents need to be generated, e.g. the control circuitry may determine that its currently the month of December and based on user pattern, the user usually generates an annual report at this time. The control circuitry 220 and/or 228 may also determine what documents are to be generated based on the user's job function 640 or assigned tasks 650. The control circuitry 220 and/or 228 may also determine from the LLM, what information is needed to generate such a document. Based on such information, the control circuitry 220 and/or 228 may provide the recommendation for the user's selection on what documents are to be generated. If the user approves the selection, then the processes of FIGS. 1, 5, 8, and 12 may be activated to generate the document requested. The document may then be generated in real time, subject to any network latency. As depicted in FIG. 7, in one example, the long form business document 720, which may be of a large length, such as 20, 50, 100, 500, 2000 pages or more, may be generated in real time or within seconds of receiving the user request 710 by using an LLM to leverage a semantic graph and coherently populate a template.

In yet other embodiments, the system may automatically suggest sources to be used in generating the content item based on sources previously accessed or browsed by the user. For example, if the user was browsing an article on the website, which may be related to the content item being generated, such article may be suggested for use in generating the content item. The system may seek user approval prior to using such a previously accessed or browsed. Likewise, emails, text messages, etc. may also be used for generating some portions of the content item.

Figure 8:
FIG. 8 is flowchart of an example of a process for generating a template that is to be populated with content, such as private enterprise data, to generate the long form business content item, in accordance with some embodiments of the disclosure.

FIG. 8 is flowchart of an example of a process 800 for generating a template that is to be populated with content, such as private enterprise data, to generate the long form business content item, in accordance with some embodiments of the disclosure. Process 800 may be implemented, in whole or in part, by systems or devices such as those shown in FIGS. 2-3. One or more actions of the process 800 may be incorporated into or combined with one or more actions of any other process or embodiments described herein. The process 800 may be saved to a memory or storage (e.g., any one of those depicted in FIGS. 2-3) as one or more instructions or routines that may be executed by a corresponding device or system to implement the method 800. The process may include generating a template using an LLM. The template may then be populated by querying the semantic graph for data.

In some embodiments, a user interface 820, associated with the user making a request to generate a content item, may provide the template to the template generator 830. In other embodiments, the template may be automatically machine generated 820 based on description received from the user interface 810, an LLM recommendation, or other sources.

If the user provided template is determined to be complete, then the process may move to block 860 where the final template may be generated. However, if a determination is made that the user provided template is either incomplete or can be further enhanced, then the template generator 830 may analyze the user provided template and edit or update the template as needed. A determination of whether the template is incomplete or can be further enhanced may be based on results from an LLM when the template is used as an input to obtain an answer. At 840, once the template is generated by the template generator 830, it may be verified using verification module 850.

In the embodiments where the template is automatically machine generated 820, it may be generated based on description received from the user or other sources. For example, a query may be made to the user requesting information that can be used in automatically generating the template. An example of such a query, which may ask the user to upload a document, is provided in FIG. 9. Other targeted queries, which may ask the user, what content item is to be generated, what is the use case for the content item, what formatting should be used for the content item, and other such relevant queries may be made. Although, in this embodiment, the template is automatically generated with little or no user input, the system may still iteratively query the user to obtain key information needed to generate the template.

The template generator 830 may generate the template, which includes a table of contents with a plurality of headings and subheadings for each section and subsection in the table of contents. One example of a template that includes nested layers of sections and subsections is depicted in FIG. 10. The template may also be a questionnaire with a list of questions being asked to the semantic graph, which acts as a knowledge base.

Once the template is generated it may be transmitted, as depicted as 840, to a verification module at 850. The verification module 850 may communicate with the user interface (or a user device associated with the user) to determine whether the generated template requires any changes. The user, via the user interface 810, may provide their changes on a layer by layer or a section by section or subsection by subsection basis. Once the verification is completed, a final template may be generated at 860.

FIG. 9 is an example of a user interface for providing information that may be used to generate the template, in accordance with some embodiments of the disclosure. In some embodiments, the user interface may display a query 910 or a query form. The query 910 may include different sections for the user to upload. Documents such as an RFP or other relevant documents that may be used by the system in generating may be uploaded using the document upload section. The user interface may also be generated for the user, or the system, to add any type of detail or information that is to be considered in generating the long form business content item.

In some embodiments, the system may also ask a specific question to the user in the query. The answer to the specific question may then be factored in when generating the template. Although a few examples of different sections are shown in this query, the embodiments are not so limited and other types of queries may also be made using the query form. For example, in some embodiments, the system may query the user and provide suggested answers for the user's selection. The user selection of the suggested answers may be factored in when generating the template.

FIG. 10 is an example of layers or tiers of sections and their hierarchy in the generated template, in accordance with some embodiments of the disclosure. The template generated, such as by the process described in FIG. 8, an example of which is depicted in FIG. 11, may include nested layers of sections and subsections. The template itself may be editable and include a table of contents with a plurality of headings and subheadings for the nested sections and subsections.

In some embodiments, as depicted in FIG. 10, a section, such as Section 1, may include Layers 2-4 of nested subsections. Section 1 itself may be in layer 1 while subsections 1.1 and 1.2 may be in layer 2, subsection 1.1.1 may be in layer 3, and subsection 1.1.1.1 and 1.1.1.2 may be in layer 4. Such layering hierarchy may be used in determining which section is to be written first. In some embodiments, the hierarchy may be used to write in a section using a bottom-up approach. This approach may include determining the deepest layer in the section, which in the case of Section 1 may be layer 4, and writing content to it first before the other sections. Additional details of the write operation are described in relation to FIGS. 12-14.

FIG. 11 is an example of a generated template, in accordance with some embodiments of the disclosure. As depicted, the generated template includes a plurality of sections and subsections that are nested underneath each other. Which sections to create and how many layers of nested subsections to create for a content item may be based on the type of content item to be generated, the data available through the semantic graph, user or system input, or LLM guidance provided.

In some embodiments, the control circuitry 220 and/or 228 may use an LLM to determine which sections to create and how many layers of nested subsections to create for generating a content item. The LLM may base its determination on several factors, including the type and amount of data available and authorized for user access.

In some embodiments, the template and the data populated in the template may be dependent on which user requests the generation of the content item. In this embodiment, different tiers of access levels may be associated with different tiers of employees based on their job titles, such as a manager having authorized access to a higher level of private data/data items than an associate or a contractor. Private data associated with the highest level of access to confidential and proprietary enterprise data and may be reserved for employees with highest level of clearance to access such authorized data, such as the CEO or C-suite employees, and may not be made available to employees with lower tier of access. Further proprietary enterprise data relevant to one department may not be authorized to be accessible by another employee whose job function does not relate to such a department. As such, in some embodiments, both identity of the user and the enterprise may be used in determining which data items from the data sources to use for generating the semantic graph. Accordingly, the semantic graph may be different for each user, employees, etc.

Since data only from only those data sources for which the user is authorized access may be used in generating the semantic graph, all the pieces, such as the semantic graph, the template, and the content item generated may be customized to each user based on their authorized level of access to data.

Furthermore, the semantic graph, the template, and the content item generated may also be customized to the enterprise. Since each enterprise has different types of data, different locations of data storage, and different strategy of data completion and storage, including different approaches to writing styles, writing strategy, additional sections to include in a document, etc., the semantic graph, the template, and the content item generated may be specific to the enterprise based on all their restrictions and preferences.

Figure 12:
FIG. 12 is a flowchart of an example of a process for performing a search query to populate section(s) of the generated template, in accordance with some embodiments of the disclosure.

FIG. 12 is a flowchart of an example of a process 1200 for performing a search query to populate section(s) of the generated template, in accordance with some embodiments of the disclosure. Process 1200 may be implemented, in whole or in part, by systems or devices such as those shown in FIGS. 2-3. One or more actions of the process 1200 may be incorporated into or combined with one or more actions of any other process or embodiments described herein. The process 1200 may be saved to a memory or storage (e.g., any one of those depicted in FIGS. 2-3) as one or more instructions or routines that may be executed by a corresponding device or system to implement the method 1200. The process may include generating a template using an LLM. The template may then be populated by querying the semantic graph for data.

In some embodiments, once a template is finalized, a search query may be made at block 1210 for each section in the template to the semantic graph 1220. The order of the search query may be based on the hierarchical order of the sections and subsections in the generated template. In one embodiment, as described earlier, the search query may start from the deepest and most nested layer or subsection in the generated template. For example, as depicted in FIG. 10, the deepest nested leaf/bottom most nested layer/most fine-grained subsection in Section 1 may be section 1.1.1.1 and 1.1.1.2, which are in layer 4 of the section tree. Since both sections 1.1.1.1 and 1.1.1.2 are in the same layer, i.e., layer 4, a search query for both sections in layer 4 may be sent to the semantic graph simultaneously and at the same time.

The search query for the selected section or sections may be sent to the semantic graph 1220. The semantic graph information and the search query information may both be fed into a generation model 1230. The generation model, guided by the search query, may leverage the semantic graph (which may also be generated based on leveraging an LLM) to determine which data to obtain for the section that is to be written. Since the semantic graph may index the data to the data sources where such data is stored, the generation model may leverage the semantic graph and obtain the indexed data that is relevant to the current section that is to be written from the data source. Once the data is obtained, the generation model may perform a section write up at 1240. The order of writing to the section may mirror the order of the search query. Using the earlier example where a search query was made for both sections in layer 4 (section 1.1.1.1 and 1.1.1.2) to the semantic graph, at block 1240 the generation model may write in parallel and simultaneously to both sections 1.1.1.1 and 1.1.1.2. In other words, the system may Parallelize the data calls made to the semantic graph for independent sections in the template when they are on a same layer.

At block 1250, the generation model may write to the content item, such as a document, presentation, slide, excel, or another type of content item. The written section may then be displayed on a display of a user interface 1260 to the user. The user may then provide feedback for the written section using the user interface. Some examples of providing feedback are depicted in FIGS. 15 and 16. In some embodiments, the method of providing feedback to rewrite a section or a subsection of the generated content item described in FIG. 12 (at block 1270) may differ from the method of providing feedback using a source as described in FIGS. 17-24. For example, the method of providing feedback at block 1270 may relate to inputting feedback in the form of text, in an area provided by the user interface to input feedback, such as by writing in the feedback, or by selection of editing suggestions while the feedback or editing discussed in FIGS. 17-24 may be by providing link(s) to a source(s) that are to be used in editing a identified section as described further below.

Referring to block 1270, once feedback to the section is provided, the feedback may be used by the search query to once again search the semantic graph based on the received feedback. In doing so, the system may perform status management 1280 to maintain the previous status. In other words, the status of what has already been built and written may be maintained and only the change that is needed based on the feedback may be made. By maintaining status, the system may save computing resources and time that would otherwise be used to regenerate the entire section or the entire content item.

The dynamic and real-time technique of providing per layer feedback and regenerating the section, and any other data or sections that rely on the feedback, may be used to provide feedback on multiple sections at a time. Unlike chatbots that can only take on feedback at a time, the embodiments may allow multiple feedbacks for a same section or for several sections at a time, or within a short duration. For example, a user may provide feedback for 5, 10, 60, or any number of sections within seconds and receive an updated output that incorporates the feedback.

The process of performing the search query on a layer-by-layer basis may be repeated until all the sections in the content item are written. As such, a coherent content item, which may be several pages, such as 5, 10, 1000, or more pages, that is logically presented and correlated (and cross-referenced as needed) section by section may be generated.

In some embodiments, the bottoms up approach used may allow the system to write a broader and more explanatory section that precedes the written section. For example, if the deepest nested leaf/bottom most nested layer/most fine-grained subsection written is section A.1 then the section above, which may be Section A, may be abstracted on a higher level than section A.1. In other words, Section A may be a higher-level summary of which further details may be provided in subsection A.1. For example, if subsection A.1 describes the maximum number of days an employee can take leave, the section above, which is Section A may lay the groundwork for section A.1 and as such describe the leave policy.

FIG. 13 is an example of a bottoms up approach in writing content into the generated template, in accordance with some embodiments of the disclosure. The system may apply a formula $(L=L_i)=$Template $(L_i)+$Summary of each child of $L_i$. Applying this formula, the deepest nested leaf/bottom most nested layer/most fine-grained subsection, which is the bottom most child, such as Section 2 . . . n, may be queried and written first then followed by higher level sections 2.1.1.1, 2.1.1, 2.1, and 2.

FIG. 14 is an example of a querying and writing order based on section hierarchy for writing content into the generated template, in accordance with some embodiments of the disclosure. In this example, the deepest nested leaf/bottom most nested layer/most fine-grained subsection may be section 3.2.1.1.1 then followed by sections 3.2.1.1 and 3.2.1.2 at the next level up. Based on the bottoms up approach, i.e. to query and write deepest nested leaf/bottom most nested layer/most fine-grained subsection first followed by higher level sections, section 3.2.1.1.1 may be queried and written first. Since sections 3.2.1.1 and 3.2.1.2 are at the same level/layer, they both may be queried and written in parallel.

In one embodiment, feedback to rewrite may be a section or a subsection of the generated content item may be either a) selection of editing suggestions, b) inputting of feedback text, or c) selecting one or more of the rewriting options presented to the user for approval. FIGS. 15 and 16 are examples of such feedback or suggestion based rewrite options. In other embodiments, editing, re-writing, and regenerating sections may be based on sources provided by the user or the system. In such embodiment, rewriting or regenerating a section, sub-section, or any or all portions of a content item may involve using an LLM and leverage deep learning techniques to perform complex analyses, operations, and transformation of data from the data source provided and then determining how to use the leverage deep learning of the source to edit, re-write, and/or regenerate the section or sub-section identified. FIGS. 17-24 are examples of using such provided sources to edit, re-write, and/or regenerate the identified section or sub-section.

FIG. 15 is an example of obtaining and processing a per layer or section-by-section feedback in accordance with some embodiments of the disclosure. In some embodiments, the process of providing feedback may include highlighting the section or subsection for which feedback is to be provided. For example, as depicted in FIG. 15, section 1510 is highlighted and identified for feedback. The highlighting may be automatic if the user's mouse, trackpad, finger, or cursor hovers over the section or subsection. The highlighting for editing and providing feedback may visually distinguish the section or subsection from other sections and subsections for which feedback is not being currently provided.

If a section or subsection is hovered upon, selected, or highlighted, then the control circuitry 220 and/or 228, in some embodiments, may automatically provide editing suggestions 1520. In some embodiments, the automatically provided editing suggestions may be based on determining user's preferences, prior edits, and patterns using machine learning techniques. In other embodiments, the automatically provided editing suggestions may also be based on preferences of other colleagues or the enterprise accepted policies. For example, other documents from colleagues or documents used in the enterprise may be fed into an LLM to determine colleagues and enterprise preferences, and recommendations may be made from the LLM on how the current content item is to be edited based on the inputted documents from colleagues and enterprise.

In one example, as depicted at 1520, the system provides the following editing and feedback options: Make it formal, improve text, make it longer, make it shorter, and custom. These are just some examples and any other form of suggestion may also be displayed on the user interface of the user in real time when the user's mouse, trackpad, finger, or cursor hovers over the section or subsection The user may also be able to select the custom icon and enter any feedback as desired. The system may leverage LLM models to revise the sections for which feedback is provided. The system may do so by performing status management of the previous status, using the feedback to perform a search query to the semantic graph, and use the search query and the semantic graph as input into a generation model for updating the section based on the feedback provided.

Although highlighting is used in the above embodiment to identify the section for editing, provide suggestions, and regenerate the section, other methods such as bolding the text, coloring the text, italicizing the text, or using some other form to visually distinguish the text for feedback may also be used.

FIG. 16 is an example of receiving feedback, editing and/or suggesting edits based on feedback, and regenerating the write-up, in accordance with some embodiments of the disclosure. In this embodiment, if the user makes a selection of the section, such as the section written by the generation model in FIG. 12, then the system may provide one or more suggestions on how the section can be rewritten or enhanced. As depicted in this embodiment, Section 1.1.1.1 may have been written by the generation model in FIG. 12 and displayed on the user interface of the user. Upon selection, the user may type in custom feedback such as "Please shorten to lesser words and use simple words" 1620. The system may then maintain state and process the feedback by querying the semantic graph. The system may then, as depicted at block 1630, generate Options 1-3, as an example, of rewriting options for approval by the user. Once the user approves, the section may be dynamically replaced with the approved writeup. In some embodiments, the system may automatically regenerate the section, without needing further user approval, and provide an undo button on the user interface allowing the user to change back to the earlier state if the user is not satisfied with the regenerated writeup.

Figure 17:
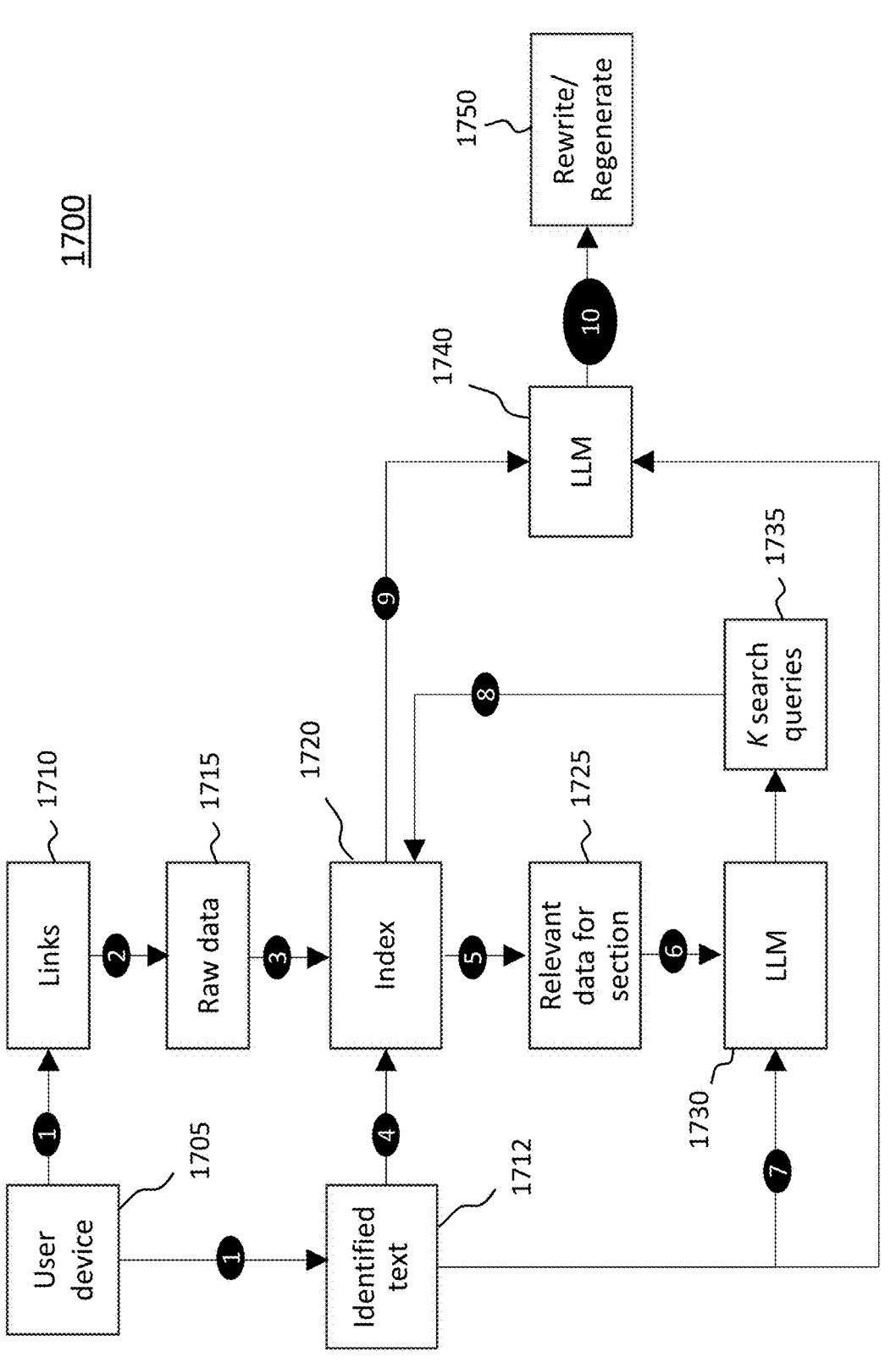
FIG. 17 is a flowchart of an example of a process for editing, rewriting, and/or regenerating one or more sections/portions of a content item using an LLM, in accordance with some embodiments of the disclosure.

FIG. 17 is a flowchart of an example of a process for editing, rewriting, and/or regenerating one or more sections/portions of a content item using an LLM, in accordance with some embodiments of the disclosure. As described above, the process of editing or providing feedback in FIGS. 17-24 may differ from the feedback described in FIGS. 15 and 16. The difference may be, in some embodiments, that feedback for FIGS. 15-16 may include typing in the feedback directly into an area without pointing to a source. Another difference may be that the editing in FIGS. 15-16 may involve adopting suggestion or edited text displayed on the user interface. Yet another difference may be that the editing in FIGS. 15-16 may involve using data already used to generate the content item or data from the same sources used to generate the content item for editing the identified text. The embodiments described in FIGS. 17-24 for editing a portion or a section of the content item may include using an identified source to perform the edit. Additional details of the editing process that involve using an identified source are described in FIGS. 17-24 below.

Process 1700, as depicted in FIG. 3, may be implemented, in whole or in part, by systems or devices such as those shown in FIGS. 2-3. One or more actions of the process 1700 may be incorporated into or combined with one or more actions of any other process or embodiments described herein. The process 1700 may be saved to a memory or storage (e.g., any one of those depicted in FIGS. 2-3) as one or more instructions or routines that may be executed by a corresponding device or system to implement the method 1700.

In some embodiments, the user device 1705, at step 1, transmits a request to edit a section or a subsection of the generated content item. Although reference to a section is mentioned, the embodiments are not so limited and identified text may be a paragraph, a page, a sentence, a group of sentences, or text relating to a particular genre, such as sales data, introductory paragraph, etc.

The user device 1705, by transmitting the request, may provide feedback on how to edit the particular section or a subsection of the generated content item. The server, such as the server identified in FIG. 2A, may receive the user device's 1705 request and identify the text 1712 that is requested to be edited (e.g., the section, subsection, sentence, group of sentences, or text relating to a particular genre to be edited). The identification of the text, in some embodiments, by the server, may be by highlighting, shading, coloring, bolding, italicizing, or visually distinguishing the text to be edited from other text (e.g., in other sections, subsections, pages, etc.) that are not the subject of the edit.

The request to edit from the user device 1705 may also include one or more links 1710 to one or more sources that are to be used in editing the identified text 1712. The request, in some embodiments, may include instructions to only use the source provided for editing, rewriting, and regenerating the identified text 1712. In other embodiments, request may include instructions to use the source identified as the primary source of editing the identified text 1712, however, other data, such as data leveraged by an LLM, in conjunction with the source identified may also be used for editing, rewriting, and regenerating the identified text 1712.

The source provided, via the link 1710, may be a website, a particular page on the website, an application, such as a HR or sales application (e.g., Salesforce), a database, a book, a video, a seminar or a webinar, an educational course, an excel file, any of the Microsoft office documents, a voice note, such as a voice message, an audio file, one or more text messages or a full chat conversation between two individuals, slack messages, or any other data for which a link can be provided.

Once link(s) to the data source(s) are identified, at step 2, raw data 1715 from the data source is obtained. Raw data may be all the data that the source contains. For example, if the link is to a website and the website includes several pages of data, then raw data would be the entire several pages of data from the website. To conserve storage space, such a large set of data, some portions of which may be irrelevant to the identified text, may be accessed and not actually downloaded.

Once the raw data is accessed, at step 3, it may be indexed and stored in index 1720. In some embodiments, some level of analysis may be performed prior to indexing the data. Continuing with the website of example above, the index may point to specific locations within the web page where the data is located. The index may categorize the data from the several pages of the website, such as by genre, topic, or some other category. It may also generate a semantic graph that indexes the raw data. In other examples, when the link is to an application, such as Salesforce that stores enterprise data related to sales, then all the data in the Salesforce application to which the user is allowed access may be accessed and indexed. Since some portion, or even a large portion, of the data from the Salesforce application may not be relevant to the identified text 1712 (i.e. the section which is to be edited based on the user request), only data that is relevant to the identified text 1712 may be used.

Data from the identified text, at step 4, may also be analyzed and placed into index 1720.

From the large corpus of data that is indexed 1720, i.e. data from the source for which the link 1710 was provided, in some embodiments, at step 5, data from the source that is relevant to the identified text 1712 may be used as input into LLM 1730. The process to identify relevant data from the source for the identified section 1725, at step 5, from the index may include indexing both the raw data from the source and the data from the identified text. In some embodiments, both the raw data from the source and the data from the identified text may be categorized, such as by topic, genre, or some other manner. A determination may be made if indexed data associated with the raw data from the source and indexed data from the identified text match in some manner, such as a match of a common category, topic, genre, etc. For example, one of the data items from the indexed data associated with the raw data from the source and one of the indexed data from the identified text match may both relate to weather in Silicon Valley. As such, the indexed data associated with the raw data from the source that relates to weather in the Silicon Valley may be determined to be relevant to the identified text.

In some embodiments, data from the raw data associated with the source that has been determined to be relevant to the identified text may be inputted into the LLM 1730. The process of indexing both the raw data from the source and the data from the identified text and determining data from the source relevant to indexed data may be a first pass at narrowing the data set from the large corpus of data from the source to a narrower more relevant set. In other words, it may be a high level or first pass attempt to narrow raw source data into relevant categories. Although determining relevant data for identified text 1725 by matching index categories has been described above for step 5, the embodiments are not so limited. Other techniques to obtain or identify relevant data from the index that can be used as input into the LLM 1730 may also be used. For example, once raw data is indexed, a model may be used to eliminate data that does not relate to any topics of the identified text. For example, the identified text 1712 that is to be edited may relate to a topic of top universities, as depicted at 1950 in FIG. 19. In this example, the link 1710 provided to the source that is to be used to edit the identified text may include some data that is relevant to the identified text 1712 and other data that is not relevant to the identified text 1712, such as advertisement, sections on transportation or sales, other links to different topic, etc. The LLM model may analyze all the data from the source provided and eliminate data that does not relate to any topics of the identified text. For data from the source that is relevant, the LLM may use such data as input to query the index 1720.

At step 7, the text identified 1712 to be edited may also be inputted into the LLM 1730. The LLM may use the inputted identified text 1712 to generate specific and targeted queries to the index. For example, the LLM may generate a query for each topic or concept described in the identified text and query the index 1720 to identify a refined narrow subset of data that is relevant to the topics and concepts used in the query.

The LLM 1730, using the relevant data 1725 obtained from the index and the identified text 1712 may generate K number of search queries to the index. The search queries may be based on the identified text, e.g., each segment, portion, sentence, keyword, or phrase of the identified text.

In some embodiments, each query, from the K number of search queries, may be designed by the LLM to semantically determine which data from the index is relevant to a portion of the identified text 1712. For example, if the identified text 1712 contains marketing data, then the search query may be automatically designed by the system to determine a semantic match between the marketing data in the identified text and marketing data indexed in the index 1720. In another example, if a keyword in the identified text 1712 contains Stanford (as in related to Stanford University), then the search query may automatically be designed by the system to determine a semantic match between the keyword "Stanford" and relevant indexed data obtained from the identified source. The process may use an LLM to ensure that a semantic match with a higher level of accuracy can be made. To do so, the LLM may analyze the identified text 1712 and generate a prompt/query to search the index for data that is relevant. In the example above, since sales data generally may be too broad, the LLM may analyze the identified text 1712 for its content and context and generate a plurality of narrow and granular/fine grained search queries that are aimed at eliciting the most relevant sales related data from the index.

The process of generating search queries to the index may result in obtaining or accessing data from the identified source (e.g., via the index) that is of higher relevance to the identified text to be edited as opposed to the raw data 1715 obtained in step 2. In other words, the process of narrowing from the large corpus of data to a narrow subset of data may result in data from the identified source that is relevant for editing the identified text.

Once the narrow set of relevant data has been identified or accessed via the index, at step 9, the narrow set of data from the source that is relevant to the identified text 1712 may be used as input into LLM 1740. In some embodiments, LLM 1740 may be the same LLM as LLM 1730. In other embodiments, LLM 1730 and 1740 may be two different LLM. The LLM 1740 (and 1730) may be a large language model or a smaller language model.

In some embodiments, LLM 1740, using the narrow set of relevant data from the identified source, may apply a deep learning technique and/or other related techniques to rewrite and/or regenerate at 1750, the identified text based on the narrow set of relevant data from the identified source. In this manner, the edit to the section or subsection requested, i.e., the identified text, may be edited and rewritten and regenerated using the source provided. Accordingly, the logic, style, coherency, linguistics, and grammar, among other elements of writing, from the source may also be adopted when rewriting or regenerating the identified text.

As used in FIGS. 17-24, rewriting may be related to writing the specific section being edited without having to regenerate the entire content item while regenerating may be related to replacing the entire section, or the entire content item, with a new section or content item that has been edited. In some embodiments, either rewriting or regenerating may produce the same final outcome, i.e. the same edited text in the section for which edits are made. It may just be by using a different process. Description in FIGS. 17-24 may as such not be limited to either rewriting or regenerating and either of the methods may be used.

Also as used in FIGS. 17-24, an LLM or an LM may be used. In other words, the model used may not be limited to a large language model and a language model of any size may be used. Additionally, other alternatives, such as neural networks or vector machines to perform functions indicated in FIGS. 17-24 may also be used.

In some embodiments, links 1710 and identified text may be directly inputted into the LLM 1730 instead of performing steps 2-6 (e.g. blocks 1715, 1720, and 1725). In such an embodiment, the LLM may use the identified text to perform semantic matching with the links provided and identify data from the links (e.g., the source associated with the link) that is relevant to the identified text. The relevant data identified may then be used at step 9 by LLM 1740 (or LLM 1730) to rewrite or regenerate the identified text.

In yet another embodiment, steps 5 and 6, which include identifying relevant data from the index to be inputted into the LLM may be bypassed. Instead, the index 1720 and the identified text 1712 may be directly inputted into the LLM 1730. In such an embodiment, the LLM may use the index 1720 and the identified text 1712 to perform semantic matching. The semantic matching may then result in identifying data from the index that is relevant to the identified text. The relevant data identified may then be used at step 9 by LLM 1740 (or LLM 1730) to rewrite or regenerate the identified text.

Figure 18:
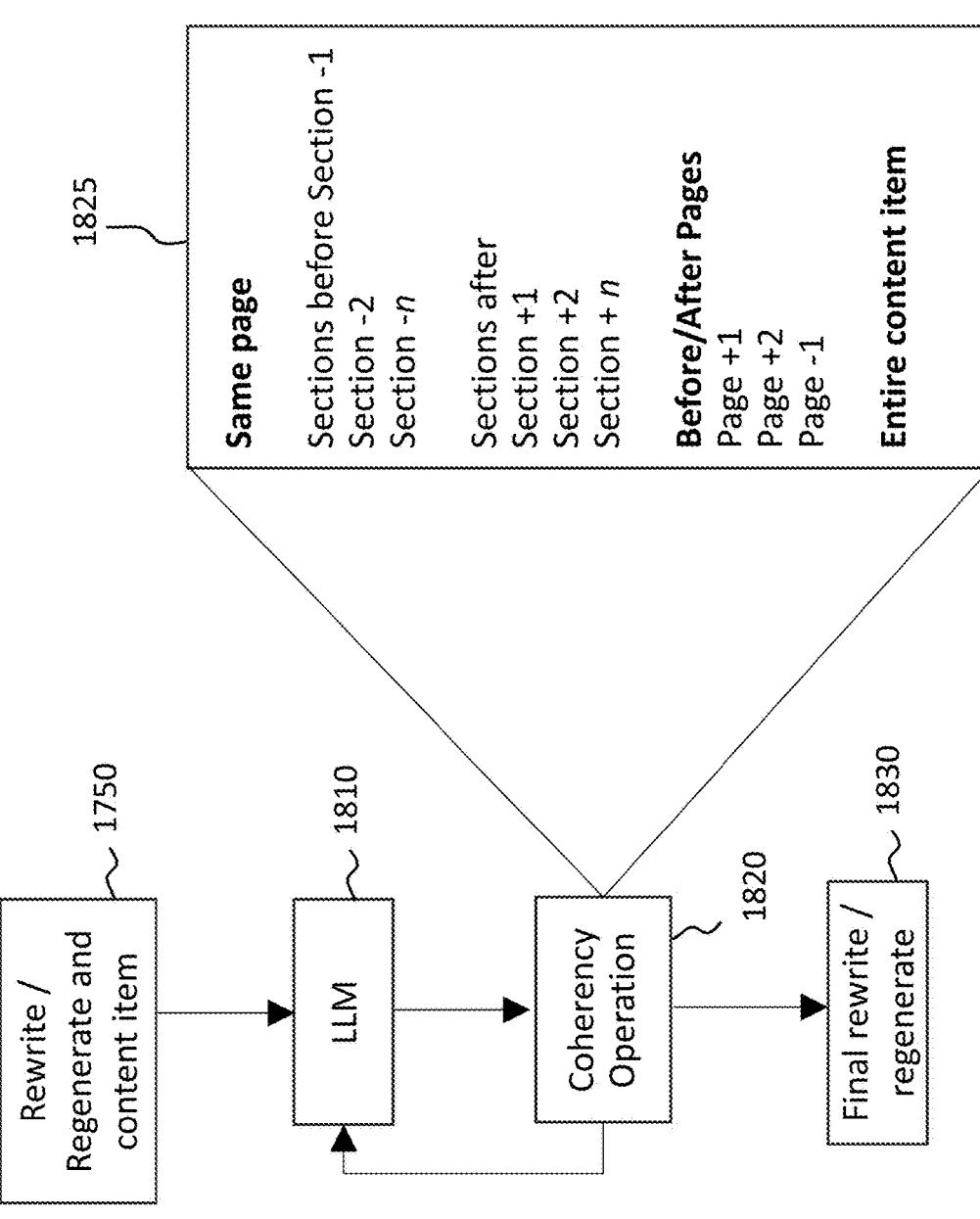
FIG. 18 is a flowchart of an example of a process for editing and rewriting one or more sections/portions of a content item for coherency, in accordance with some embodiments of the disclosure.

FIG. 18 is a flowchart of an example of a process for editing and rewriting one or more sections/portions of a content item for coherency, in accordance with some embodiments of the disclosure. Process 1800, as depicted in FIG. 3, may be implemented, in whole or in part, by systems or devices such as those shown in FIGS. 2-3. One or more actions of the process 1800 may be incorporated into or combined with one or more actions of any other process or embodiments described herein. The process 1800 may be saved to a memory or storage (e.g., any one of those depicted in FIGS. 2-3) as one or more instructions or routines that may be executed by a corresponding device or system to implement the method 1800.

In some embodiments, once the data is rewritten or regenerated at 1750, which is also depicted in FIG. 17 as the last step, the rewritten or regenerated data may be inputted into an LLM, such as LLM 1810 for further analysis. In some embodiments, LLM 1810 may be a separate LLM or the same LLM as 1730 or 1740 in FIG. 17.

In some embodiments, LLM 1810 may use the rewritten or regenerated identified text 1712, e.g., the section or sub-section of the content item that was edited based on the source provided, and the entire content item as input to determine coherency. In other words, a determination may be made using the LLM 1810 whether other sections in the content item that were not edited, because of the edit, rewriting, and regeneration of one of the sections, i.e. the identified text 1712 using the source, are coherent? In addition to coherency, determinations relating to logic, style, linguistics, and grammar, among other elements of the writing may also be made. In some embodiments, coherency may include all the writing elements (e.g., logic, language, style, linguistics, grammar, etc.). The determinations made would identify whether changing one section in the content item (i.e. the section or identified text that was rewritten and regenerated) affects other sections in the content item in their coherency, logic, style, linguistics, grammar, etc.

In some embodiments, one of the goals may be to have the entire content item, the entire page on which the identified text was rewritten/regenerated, or a few sections before and after the identified text was rewritten/regenerated, flow with the identified text that was rewritten/regenerated such that the text flows and provides the feel of one coherent document, and not a plurality of disjointed sections that are written in different style, language, grammar, logic, coherency etc. As such, the LLM may evaluate for coherency, and any other writing component through process 1800, and rewrite/regenerate other sections of the content item to adjust if any such writing element discrepancies are detected.

In some embodiments, the LLM 1810 may identify which sections in the content item are not coherent with the rewritten/regenerated section. The results showing which sections are not coherent may be displayed on a user interface and an option may be provided to the user to approve modifying such sections to make them coherent. As such, using the UI, the user may approve modifying all sections in the content item to make them coherent to the rewritten/regenerated section or pick and select which sections, subsections, pages, etc., to modify to make them coherent. If multiple sections or pages are selected by the user for modification, they may be modified simultaneously and in parallel by using the LLM.

As depicted, the LLM 1810 may perform a coherency operation 1820 in which all, some, or selected sections and subsections of the content item may be edited, rewritten and regenerated to make them coherent to rewritten/regenerated sections. In some embodiments, the coherency operation may be performed on a section-by-section, node-by-node, layer-by-layer until all the sections in the content item, or all the sections approved for modifying to make them coherent, are rewritten/regenerated. In other embodiments, the coherency operation may use a bottoms-up or most fine-grained approach as described above to make all the sections in the content item, or all the sections approved for modifying, to make them coherent with the rewritten/regenerated section.

In some embodiments, the user may identify what writing component needs to be synchronized due to the rewriting/regeneration of the identified text. In other words, the user may select any one or more of style, grammar, language, or any other writing components to modify. The user may also identify a particular section for making it coherent with the edited section. The user may also identify which sections, pages, chapters of the content item to modify. In some embodiments, formulas, such as make X number of sections before and after, or Y number of pages before and after the section rewritten/regenerated coherent with the edited section may also be generated and used.

At 1830, the data made coherent (or modified for any other combination of writing components) by the LLM 1810 may be used to perform a final rewrite of the entire content item, or all the sections approved for modifying to make them coherent.

In some embodiments, the user may identify a first source for editing and a second source for its writing style. In such an embodiment, the LLM may follow the editing process as described above in obtaining content from the first source that is relevant to the section to be edited and then edit, rewrite, and/or regenerate the section using the relevant content. The LLM would then use deep learning to determine the writing style of the second content item. The LLM may then use the determined writing style of the second content item to edit, rewrite, and/or regenerate the section in the same writing style as that of the second source. The process may also be performed in parallel instead of sequentially.

FIG. 19 is an example of using a separate source for editing each of the plurality of sections of the content item, in accordance with some embodiments of the disclosure. In some embodiments, an example of a portion (such as a page) of a content item is displayed on a user interface 1900. Although the content item may have several sections, in this embodiment, a page visible on the user interface may display sections 1 to 4 of the content item. Other pages and sections of the generated content item may be displayed on the user interface by scrolling, selecting page up or next page, navigating a table of content menu, etc. In one embodiment, section 1 may relate to weather and outdoor activities, section 2 may relate to wealth of innovation, section 3 may relate to top five ranked universities, and section 4 may relate to job opportunities, all of which relate to Silicon Valley. Furthermore, the content item as a whole, or a section title for sections 1-4, may have a title: Pros and cons of living in Silicon Valley.

In one embodiment, text associated with each section may be displayed on the user interface 1900. The text may be expanded or minimized based on user selection. For example, the user may choose to just see the titles of each section or select the title and expand it to see the text within each section. In some embodiments, the text for each section may be shown by default and if the user desires, then the user may be able to select an option to show less.

In some embodiments, the user may select which displayed sections are to be edited. The user may select the section to be edited using their cursor, mouse, finger in a touch screen environment, or gesture to indicate which section is to be edited in accordance with a source provided. In other embodiments, the system may suggest sections to be edited and highlight, bold, italicize, or visually distinguish the section for user approval to initiate the editing process.

In some embodiments, the user may identify a source that is to be used for editing the identified text selected. The user may identify a different source for each identified text (such as each different section) displayed. For example, for Section 1 the user may identify source 1920. Source 1920 may be a link provided by the user using their user interface. The source may be to a website such as weather.com which may include data relating to weather. The source may contain weather related data not just for Silicon Valley but likely the entire United States. It may also include weather data for several countries in the world. The website may also contain breaking news relating to weather related to weather related emergencies such as hurricanes, tornadoes, floods in various parts of the world. Since the content item may relates to Silicon Valley (as referred to in the title 1900), and the section to be edited, i.e., section 1910, relates to weather and outdoor activities in Silicon Valley, a large percentage of data in the source weather.com may be irrelevant to Section 1 since it relates to weather and related news outside the Silicon Valley. As such, once the source is identified, it may undergo the process depicted in FIG. 17 to narrow the large corpus of data to a selected narrow set of data from the weather.com source that is relevant to the section 1910 to be edited, i.e., section 1 having a title "Weather and Outdoor activities." The process of FIG. 17 for editing section 1 using the source weather.com may include, indexing the raw data from weather.com, which would index all data, including for example, weather data in Silicon Valley, historical data over the years of weather patterns in the Silicon Valley, weather data in different states of the United States, such as Alabama, Florida, New York. It may also index data from the source that may include raw data from other countries and other regions. Since weather data from Alabama, Florida, and other countries in the world is largely unrelated to weather in Silicon Valley, the process may use an LLM to narrow the set of data from the source to data that relates only to Silicon Valley. The process may include querying the raw data indexed by using an LLM to generate specific queries using text in section 1 and identifying a narrow set of relevant data from the large corpus of data indexed. The queries for example may be: What is the year-round climate in Silicon Valley, what is the hottest/coldest recorded temperature in Silicon Valley, what outdoor activities can be done based on weather conditions during December in Silicon Valley, how much does it rain per month in Silicon Valley, etc. Such targeted queries may be made to the indexed data to narrow the set of data to data that is relevant to section 1. The narrowed set of data from the source weather.com may then be inputted into a second LLM (which may be the same as the LLM used previously in the process) to then use the narrowed set of data and edit, rewrite, and regenerate Section 1 using only the relevant data identified from the source weather.com.

In some embodiments, section 1930 may relate to the topic of wealth of innovation in the Silicon Valley, which may include a discussion of top companies in Silicon Valley and the wealth of innovation over the years. The companies identified in this section 1930 may include companies such as Google, Meta and Adobe that are leading the forefront of innovation in Silicon Valley. If the user wants to edit this section, the user may add any source, such as by using their user interface, that is to be used in editing this section 1930. For example, the user may add an email 1940 that the user may have received from someone either internal or external to the company for which they work or for which the content item is being written. The e-mail, for example, may include other data that relates to innovation in the Silicon Valley and may even have names of other companies that might be relevant to section 1930. Once the email has been identified as a source to edit section 1930, the control circuitry may apply the process of FIG. 17 to evaluate relevant text from the email and then rewrite and regenerate section 1930 using one or more LLMs based on the text in the email 1940 provided.

In some embodiments, Section 3 (1950) may relate to the top five ranked universities in Silicon Valley. The user may identify, as one of the sources, the website of Stanford University 1960 to be used in editing section 1950. In the event that the user has not identified Stanford University, and the text in section 1950 does not indicate Stanford University (which may be in the top 5 when the content item is being generated or edited), then control circuitry via use of the LLM may determine that Stanford University is missing from the text in section 1950 and present the option to include them in the section for user approval. As such, control circuitry using an LLM may also identify missing information that it deems relevant to the section being edited and identifies sources to be used that would allow inclusion of the missing information.

In another embodiment, Section 4 (1970) may relate to job opportunities. The user may identify a group chat, a text message, or a conversation 2980 between the user and a second user in which job opportunities in the Silicon Valley may have been indicated. The control circuitry may use the source provided (i.e., the email) and run it through the process of FIG. 17 to extract relevant information and use it to edit the section 1970.

FIG. 20 is an example of receiving a plurality of weighted sources for editing and rewriting a single section of the content item, in accordance with some embodiments of the disclosure. In some embodiments, more than one link to more than one source may be provided for editing the identified text 2015. The links may be to multiple distinct documents, such as document 1 (2010), document 2 (2020) and presentation, such as PowerPoint (2030). The link may also be to a website, to a specific page of a website, application, database, email, text message or chat between two individuals, a voice note, a video, a book, an excel file, an accounting file, etc. The link may be to any source as desired by the user or identified by the system for use in editing the identified text 2015.

In the embodiment where more than one link, which points to more than one source, is provided, a weight or a priority may be assigned to each source. For example, as depicted in FIG. 20, document 1 (2010) may be given a 37% weight, document 2 (2020) may be given a 24% weight, and presentation, such as PowerPoint (2030), may be given a 39% weight.

The weight for the source provided, in one embodiment, may be provided by the user device that provides the links to the sources. The user device may indicate which document is to be prioritized based on the weights provided. In one embodiment, in the event there is a conflict of content to be used between the different links provided, the LLM may give a higher preference, in accordance with the weight provided, to the document with the higher weighted source in resolving the conflict. In another embodiment, the writing style of the highest weighted document may be used by default to edit the identified text 2015. In this embodiment, although the LLM may use content from all three identified documents proportional to the weight provided, the LLM may select the writing style of one of the sources, such as the source with the highest weight for editing.

Figure 21:
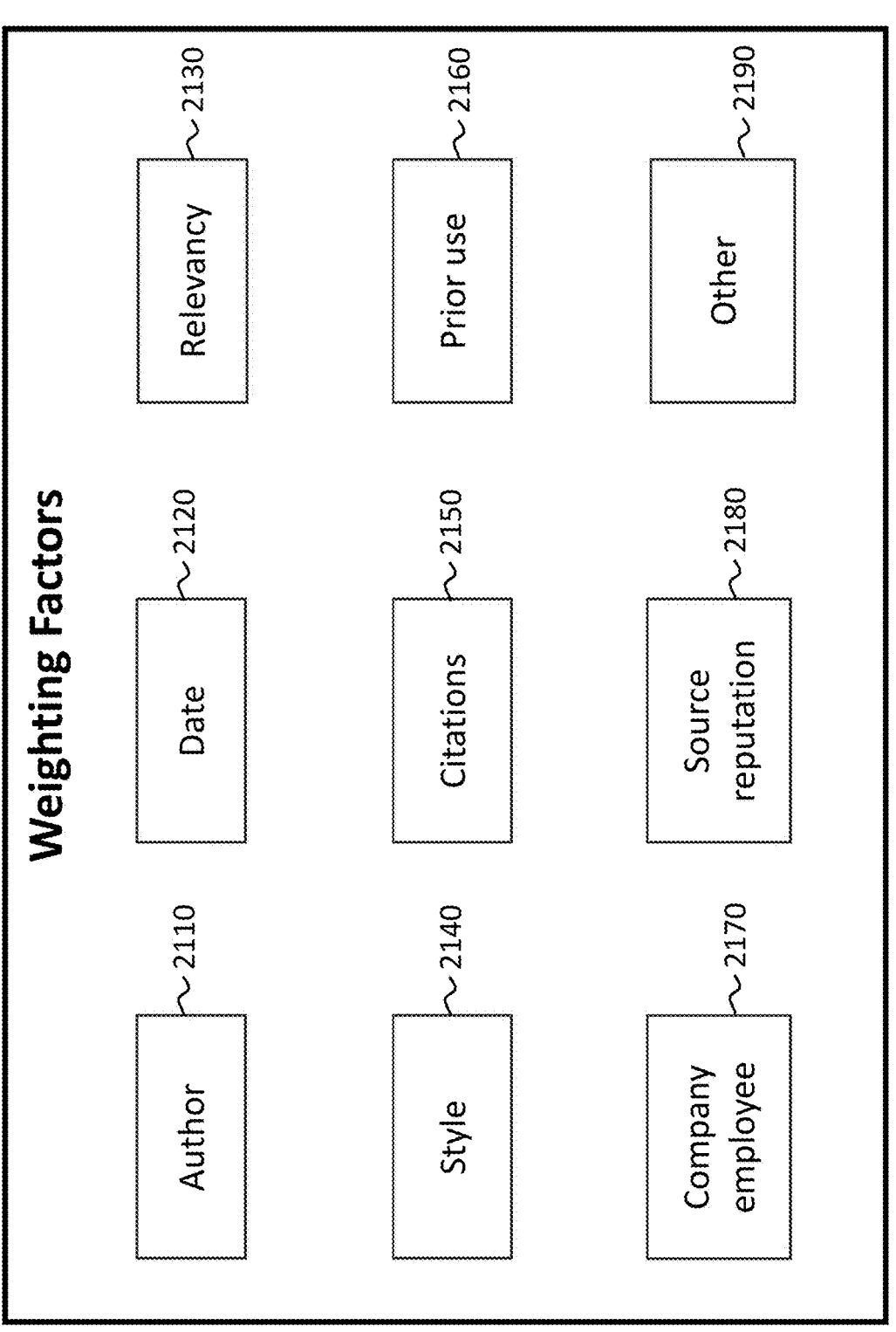
FIG. 21 is a block diagram of weighting factors that may be used in calculating a weighted score that is to be used in editing and rewriting one or more sections of the content item, in accordance with some embodiments of the disclosure.

The weight for the sources provided, in another embodiment, may be automatically generated. The links, or the data indexed based on the links as described in FIG. 17, may be inputted into an LLM to determine a weight. In addition to, or instead of an LLM, neural networks, and other analysis mechanisms may also be used to calculate a weight for the provided sources. In some embodiments, the control circuitry may use a plurality of weighting factors, as depicted in FIG. 21, to determine the weight of the source provided. These factors may be used in any combination to determine the weight of the source provided. In the event there is a conflict of content between the different links provided, the LLM may give a higher preference, in accordance with the weight provided, to the document with the higher weighted source in resolving the conflict. Additional details relating to weighting factors, calculating of the weighting factors, and using sources based on the weighting factors is described below in relation to FIG. 21.

FIG. 21 is a block diagram of weighting factors that may be used in calculating a weighted score that is to be used in editing and rewriting one or more sections of the content item, in accordance with some embodiments of the disclosure. The weighting score, in some embodiments, may be provided as a percentage. Other scoring scales instead of a percentage may also be used. In some embodiments, one of the weighting factors for the source may be associated with the author 2110 of the source. For example, the reputation of the author, the number of articles the author has written, the number of articles written by the author that are cited by other publications, any awards won by the author, years of knowledge of the author with respect to the topic on which the author has written, the author's skill set and educational degrees, and any other reputation, positive or negative reviews of the author or social media remarks may all be considered and factored in terms of assessing the weighting factor for the author.

In some embodiments, one of the weighting factors for the source may be associated with the date 2120 of the source. For example, if the source is outdated, too old, irrelevant due to date, or for which a date cannot be authenticated, then such a source may be weighted with a lower score as opposed to a source that is current, in the same year or month as the content item being edited, or the date of which is authenticated.

In some embodiments, one of the weighting factors for the source may be associated with relevancy 2130 of the source. For example, the source provided by the user may no longer be relevant to the current state of technology. The relevancy may depend on when the source was originally written and if advances in time or technology make the original source irrelevant or no longer applicable to current state of technology or state of conditions. If the source relates to a topic of capturing great images using a camera, and references or text in the source relates to using film technology then the source may have become obsolete because the current technology, which uses digital cameras, may be more relevant to current times. Some of the relevancy of the source may be taken into account to determine the overall weighting score for the source provided.

In some embodiments, one of the weighting factors for the source may be associated with the style 2140 of the source. For example, if the style in which the source is written does not conform to current standards or is not suitable for the enterprise, then the source may be weighted accordingly for its style.

In some embodiments, one of the weighting factors for the source may be associated with the citation 2150 of the source. Control circuitry may evaluate the number of citations to the source provided. For example, if a source has been cited over a threshold number of times, is cited by well-known articles, companies, organizations (e.g., cited in the Merriam Webster dictionary, by I.E.E.E., the White House, in well-known educational books), or has a good citation reputation, then such a source may receive a higher weighted score.

In some embodiments, one of the weighting factors for the source may be associated with its prior use 2160 or use by another employee of the same company 2170 for which the content item is being prepared. In some embodiments, the control circuitry may leverage a machine learning or an artificial intelligence algorithm to determine whether the source has been previously used by the user him/herself or by other employees of the company. Since such data may be private, the control circuitry may only search those databases and repositories within the company, or those used by the user, for which it is granted access. Source has been previously used either by the user or one or more employees of the same company, then the source may be weighted more heavily since it may have already been authenticated and commonly accepted.

In addition to the above-mentioned weighting factors, other factors 2190, such as reputation of the source 2180, awards or other accolades associated with the source, or any other factor that the user or system adds to the weighting factors may be used to evaluate the source. In some embodiments, the control circuitry 220 and/or 228 may look to other weighting factors used by other employees in the same enterprise/corporation and adopt them in weighing the current source. In some embodiments, the weighting factors used by other employees in the same enterprise/corporation may be automatically adopted and in other embodiments they may be adopted after user approval.

FIG. 22 is an example of using separate primary and secondary sources for each of the plurality of sections of the content item for editing and rewriting the plurality of sections, in accordance with some embodiments of the disclosure. In some embodiments, the user or system may provide more than one source for the section to be edited.

The source provided may be based on the content and context of the section to be edited. For example, if the control circuitry 220 and/or 228 determines that the document being edited in an enterprise related document, and the data within the identified section that is to be edited is financial data, as depicted at 2210, then control circuitry 220 and/or 228 may identify an LLM that has been trained by financial data or an LLM of the finance department to be used as a source for editing the section that includes financial data. This is because, after determining that the data is enterprise financial data, and the control circuitry 220 and/or 228 also determining that the user that is creating the document has authorized access to the financial department's database, the control circuitry 220 and/or 228, if it determines that the data in the financial department's database is relevant to the section being edited, it may suggest it as a source.

In another embodiment, if the control circuitry 220 and/or 228 determines that the data relates to sales data, as depicted at 2220, then the control circuitry 220 and/or 228 may identify the primary source to be Page X of website ABC and secondary source to be Page Y of website DEF to be used as a source for editing the sales data. In one embodiment, such sources may be outside the enterprise and in another embodiment such sources may be private sources within the enterprise that may need a password or other authorization for access. The control circuitry 220 and/or 228 may also automatically set priorities, weights, and how such data is to be used, e.g. if a conflict arises, to use website ABC as primary source to override the conflict. It may also place weights on which data from which source, primary or secondary is to be used for editing the identified section. The user may also identify the finance department LLM as a source for editing the section identified.

In another example, the section identified for editing may be any section such as an introductory paragraph 2230, a recommendations section 2240 in the content item, a policies section 2250, or a projections section 2260. The user or the system may identify a single source, a primary or secondary source, or any number of sources for editing each section. The sources identified may be any source as depicted in FIG. 4 or a new source that has not been used before. In some embodiments, if a source has been used during the first phase of generating the content item, such as generating the content item at block 105 of FIG. 1 or generating the content item as described in FIGS. 3-16, the same source may also be reused for editing an identified section, especially, if it was identified by the user or system to be used in editing the identified section.

Figure 23:
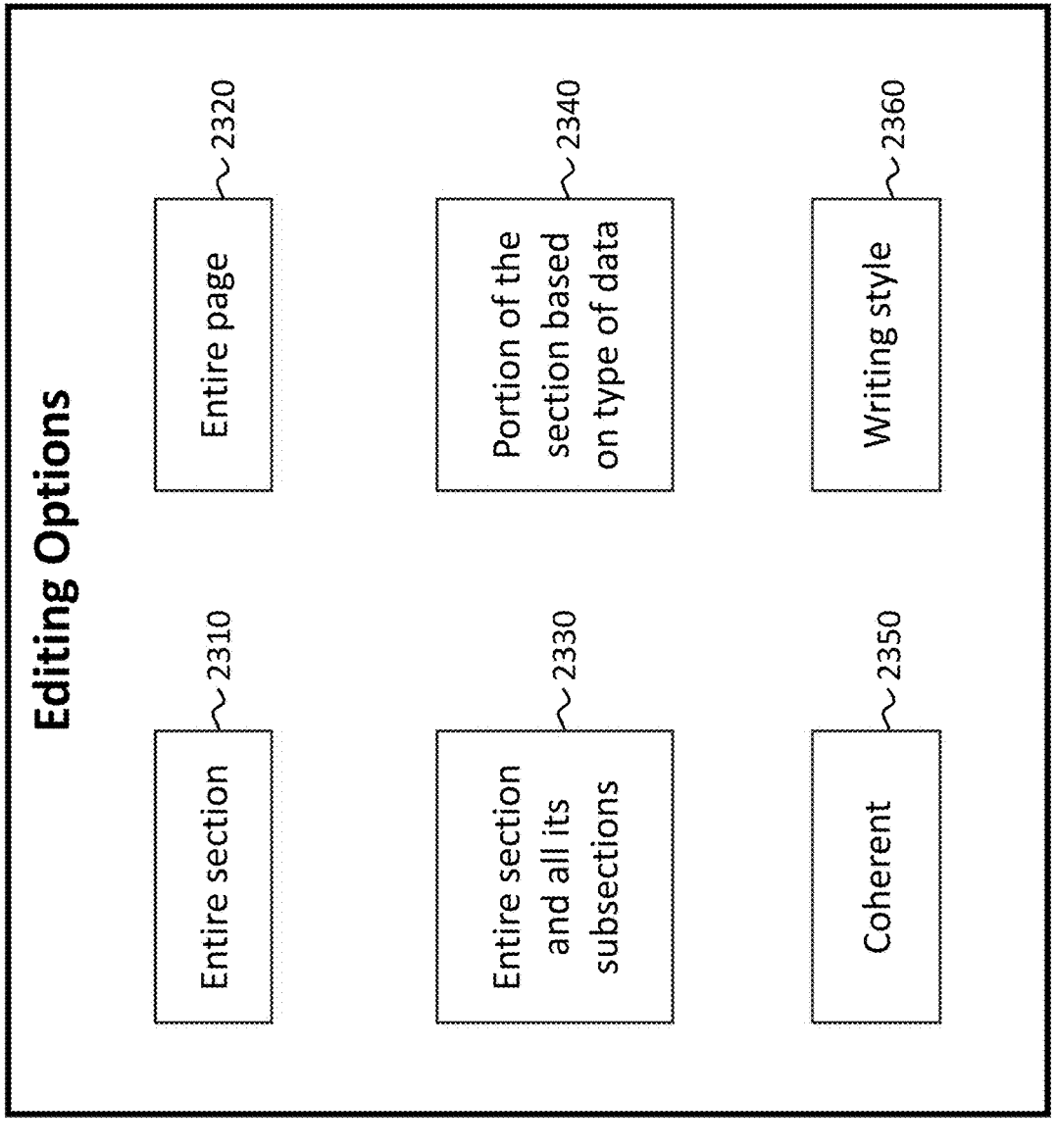
FIG. 23 is a block diagram of editing options that may be used in editing, rewriting, and/or regenerating the identified text in the content item, in accordance with some embodiments of the disclosure.

FIG. 23 is a block diagram of editing options that may be used in editing, rewriting, and/or regenerating the identified text in the content item, in accordance with some embodiments of the disclosure. In some embodiments, the user may be provided an option to edit the entire content item 2310. In other words, when one piece of identified text (e.g., one section) of the content item has been edited, such as section 1 (1910) in FIG. 19 or section 2 (2015) in FIG. 20, to make the remainder of the content item coherent with the identified text that has been edited, one of the selections for editing provided to the user may be to edit the entire content. Accordingly, when a selection to make the entire content item coherent is selected, the control circuitry 220 and/or 228 may determine on a section by section, layer by layer, or node by node which sections in the content item are incoherent with the identified text that has already been edited. The control circuitry 220 and/or 228 may then utilize the LLM, such as LLM 1730 or 1740 in FIG. 17, to edit, rewrite, and/or regenerate the other sections in the content item to the same level of coherency as the edited identified text.

In some embodiments, the user may be provided an option to edit the entire page 2320 that is visible on the user interface or the entire page on which the edited section is located.

For example, a page of the content item displayed on a user interface may include 3 sections. If one section on that page is edited and the other two sections become incoherent due to the edits, the incoherency may be more visible for a user that glances at the entire page at the same time. As such, to cure such visible incoherency, the user may be provided an option to make them coherent. In other words, the option may be to make other sections on the same page, or visible on the same page in the user interface coherent with the edited section. Accordingly, when such a selection is made, the control circuitry 220 and/or 228 may determine which sections on the same page are not coherent and utilize the LLM, such as LLM 1730 or 1740 in FIG. 17, to edit, rewrite, and or regenerate them to the same level of coherency as the edited section.

In some embodiments, the user may be provided an option to edit the entire section and its subsections 2030. For example, if the section edited is Section 2, which includes subsections 2.1 and 2.2, and section 2.2 includes further subsections 2.2.1 and 2.2.2, then selection of option 2320 may edit all the nested subsections for the edited section to make them coherent with the edited section. The user may also be provided an option to edit a certain number of nested layers and not all the nested layers. Accordingly, when a selection to make the entire section and its subsections 2030 coherent is selected, the control circuitry 220 and/or 228 may determine which sections, subsection, and layers of nested sections are not coherent and utilize the LLM, such as LLM 1730 or 1740 in FIG. 17, to edit, rewrite, and or regenerate them to the same level of coherency as the edited section.

In some embodiments, the user may be provided an option to edit a portion of the section based on type of data 2340. For example, if the section edited contains sales data, then the option may allow editing of all sales data that exists throughout the entire content item, throughout the page, or throughout the sections and subsections. In other words, any sales data in the content item that is related to the edited section may also be edited to make it coherent with the edited section. Such editing may provide the entire content item to have a consistent coherent message when it comes to sales data such that data that is incoherent or conflicted is edited. Accordingly, when such a selection is made, the control circuitry 220 and/or 228 may determine which sections, subsection, and layers of nested sections and various portions of the content item includes relates sales data that is not coherent and utilize the LLM, such as LLM 1730 or 1740 in FIG. 17, to edit, rewrite, and or regenerate them to the same level of coherency as the edited section. In some embodiments, prior to making all the sections coherent in the content item with respect to sales data, the control circuitry 220 and/or 228 may display on the user interface the sections that are to be edited for coherency and allow the user to pick and choose which sections the user approves for editing.

In some embodiments, the user may be provided an option to edit for coherency 2350. In other embodiments, the user may be provided an option to edit for writing style 2360. In yet other embodiments, the editing option may allow editing with respect to grammar, language, location-specific language and words (e.g., garbage in American English may be referred to as rubbish in British English or drapes in American English may be referred to as curtains in other parts of the world), tone, formal/informal, casual/serious, organization of writing, targeted audience, capitalizations, sentence structure, introduction or conclusion for each section or paragraph, or any other writing component. In other words, the user may select any of the options 1210-1240 to make it coherent for all purposes, may select such options to make them coherent for selected components of writing, or may select one or more components of writing to synchronize with options selected in 1210-1240. For example, the user may select to only make the grammar or location-specific words be synchronized for the options selected in 1210-1240.

FIG. 24 is a block diagram of an example of a user interface used for editing the content item, in accordance with some embodiments of the disclosure. The user interface 2400 may be displayed on the electronic device associated with the user. The user interface may include a plurality of areas in which a content item, source identified, editing options, sections affected due to editing of one section, and conflicts within the content item may be displayed. Although some areas of the user interface are described, the user interface is not so limited. For example, the user interface may include other areas that display information relating to different topics associated with editing of the content item. This may include, for example, not shown in the figure, the weighted score of each source identified to be used for editing the content item.

In some embodiments, the user interface 2400 may include a content item section 2410. The content item action may display one or more pages, sections, subsections, or a plurality of layers of nested sub-sections, of the content item. The user may be able to identify text displayed in the content item section for editing, rewriting, and regeneration.

The user interface 2400 may also display the source identified by the user or the system in the source identified section 2420. This may be the source that is to be used by the LLM, such as via the process of FIG. 17, to edit the identified section, such as section 7 (2460) in FIG. 24. In some embodiments, the user may select a button that might open up a pull-down menu for the user to identify a source (not shown). In some embodiments, the area for identifying the source may provide a space for the user to input a URL (not shown). When the URL is inputted, the user interface may automatically show a still image of the identified source.

The user interface 2400 may also display editing options 2430. The editing options may allow the user to select+/− sections, subsections, or pages that are to be edited. For example, the user may select+/−two sections that are to be edited with respect to already edited Section 7 (2460) to make the other sections coherent with Section 7 (2460). Some examples of editing options are provided in FIG. 23.

The user interface 2400 may also display suggestions 2435 of what sources are to be used to edit the identified section, such as Section 7. The suggestions 2435 may be based on results from deep learning techniques used to analyze the section, e.g., section 7 (2460), which includes analyzing its content and context, and determining whether other articles, papers, websites, documents prepared by other colleagues of the same enterprise, or any other sources may be relevant for editing the identified section. For doing so, the control circuitry 220 and/or 228 may input the section to be edited, e.g., section 7, into an LLM. The LLM may then be used for analyzing content and context of the identified section to identify other articles, papers, books, websites, or any other sources that are either used within the enterprise or external to the enterprise that may be relevant to the section and may be used as a source for editing this section. The control circuitry 220 and/or 228 may also display on the user interface 2400, weighted scores associated with each source suggested. Such weighted scores may be computed based on the weighting factors described in FIG. 21.

In some embodiments, the control circuitry 220 and/or 228, using an LLM and leveraging deep learning, may analyze the content and context of the identified section, e.g., section 7. For example, since section 7 (2460) relates to determining signal noise ratio (SNR) using a technique known as an RMS technique, the control circuitry 220 and/or 228 based on results from the LLM may suggest other techniques, such as the experimental method to calculate the signal to noise ratio. Such a suggestion may require the control circuitry 220 and/or 228 to use an LLM, leverage deep learning through LLM, which emulates the function of comprehending and understanding the content and context of the identified section, and then providing the source suggestions.

The user interface 2400 may also display sections in the content item that may be affected based on editing the identified section. Such affected sections may be listed in the sections affected 2440 area of the user interface. For example, if Section 7 is edited based on the source identified, then other sections such as section 12.3.2, section 9.1, and section 12.2, which may also relate to signal to noise ratio, may be affected. As such, the control circuitry 220 and/or 228 may display all those sections affected on the user interface for the user to select one or all the affected sections for making them coherent to the section edited. E.g., section 7.

The user interface 2400 may also display conflicts 2450 within the content item that may be caused due to editing of the identified section, such as Section 7. For example, the source identified, which uses experimental methods to calculate signal to noise ratio, may be used to edit, rewrite, regenerate Section 7. Based on the editing performed on Section 7, another section, such as section 12.3.2, which also discusses the same topic, i.e., signal to noise ratio, may be affected. For example, since the earlier write operation may have had both sections 7 and section 12.3.2 use the same method to calculate signal to noise ratio, e.g., using the RMS method, editing section 7 using the provided source which uses a different calculating method may make section 12.3.2 which uses the RMS may yield different results and be in conflict with the edited section 7. As such that circuitry may identify the two different methods used within the same content item for calculating the signal to noise ratio and identify conflicts between the two sections. Since both experimental methods may result different results, the user may choose to make both sections (e.g., section 7 and 12.3.2) coherent by using either the old method, which is the RMS method, or using the new method from the source identified, which is the experimental method, for all the sections that are in conflict.

In some embodiments, when such a conflict arises, the control circuitry 220 and/or 228 may provide a plurality of options on the user interface for the user to resolve the conflict. For example, the conflict resolution options provided may be to override the conflict, do not make the change, use one method to calculate the signal to noise ratio over the other method, or display both methods and identify them as conflicted (such as indicate the other method used in the different section next to the section edited). In addition to the conflict resolution options displayed in FIG. 24, the user or system may also input other conflict resolution options. Identifying the conflict, displaying options to resolve the conflict, and implementing the selections may require more than just making a section coherent to another section in terms of its writing style or writing components. Such coherency may require a deeper analysis where different calculations may have to be made, different logic applied, and a deeper understanding of the differences that may be obtained by the embodiments using LLMs and deep learning.

In some embodiments, when a user selects a section to be edited using a source, the control circuitry 220 and/or 228, using LLMs may identify different topics within the section and indicate multiple sources that may be relevant in editing the identified section. For example, as described above, the control circuitry 220 and/or 228 leveraging LLMs and deep learning may determine that the section to be edited includes data relating to sales as well as engineering. It may also determine a secondary, or a minor topic, mentioned within the section, and determine whether editing of the section, including editing major and minor topics included in the section, affects other unedited sections in the content item that also include the same major and minor topics. The control circuitry 220 and/or 228 may also indicate the level of incoherency between the section not edited and the section edited, e.g., it may rate the level of incoherency on a scale of minor, medium, of high, or on a scale of 1-10 thereby allowing the user to decide whether to make the unedited and incoherent section coherent. For example, a lower level of incoherency may relate to, for example, the words or spelling being incoherent. As such, the user may choose to not edit the unedited section for coherency if the level of incoherency is minor. What constitutes the range of lower to higher level of incoherency may be determined by the user or the system.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. The processes and features described herein may also include, in some embodiments, the user, via a user device, may issue a query to generate a proposal for the template the user or the system has provided and a document, such as a request-for-proposal document, the user has uploaded. The query may then enter an orchestrator system (also referred to as an agent router) and be redirected to the appropriate component to create a proposal, e.g., an agent. Based on the user query, the agent may determine whether it already has a template to generate the proposal. If it already has the template, then the agent may retrieve the existing template. However, if a determination is made by the agent that a template does not exist, then the agent may generate a new template based on instructions added by the user (as a document, conversation or fallback default templates) or system, or based on an LLM recommendation. Once the template is generated, based on the template's outline of sections of the long-form-content for a proposal, an execution plan on how to get information and fill in the different set of sections of the proposal may be determined. This includes determining which sections can be filled in parallel, which needs to be added in sequence on others for e.g. sections like introduction, conclusions etc. Such a determination may be guided by an LLM. Based on the execution plan, relevant data (from different data providers) may be retrieved. This process may be performed for all the sections and subsections in the template. Once all the sections are generated, the output may be formatted according to the user or system provided guidelines. The content in all sections may be modified to ensure coherency and any redundancy may be removed.

Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating, by control circuitry, a long-form textual content item using a first language model based on a user request, wherein the generated long-form textual content item includes a plurality of sections organized in a hierarchical structure;

receiving a request to edit a particular section or a portion of the particular section, comprising identified text from the plurality of sections, wherein the request includes a link to one or more sources to be used for editing the particular section or portion of the particular section;

identifying, by the control circuitry, the particular section or portion of the particular section to be edited based on the received request;

identifying, using a second language model, a subset of relevant data from the received one or more sources, wherein the second language model uses data from the particular section or portion of the particular section to identify the subset of relevant data from the received one or more sources; and identifying, using a second language model, a subset of relevant data from the one or more sources, wherein identifying the subset comprises: indexing raw data from the one or more sources in a semantic graph that establishes semantic relationships between data items from the sources;

generating, by the second language model, a plurality of targeted search queries to the semantic graph based on analyzing the context and content of the identified text within the particular section;

accessing a narrow set of data from the semantic graph that matches the plurality of targeted search queries;

editing the particular section or portion of the particular section using the narrow set of data; and automatically determining, by the control circuitry using the second language model, that a second unedited section in the long-form content item has become incoherent relative to the edited particular section by comparing a first coherency value of the long-form content item calculated prior to editing with a second coherency value calculated after editing; and in response to the determination, automatically synchronizing the second unedited section to make it coherent with the edited particular section.

2. The method of claim 1, further comprising:

receiving a second request to edit a second section or portion of the second section of the generated long-form content item to make it coherent with the edited particular section or portion of the particular section;

inputting data from the second section or portion of the second section into the second language model; and editing the second section to make it coherent with the edited particular section based on the second coherency value.

3. The method of claim 1, wherein automatically determining that the second unedited section has become incoherent comprises:

applying a coherency operation to synchronize the unedited sections such that the long-form content item reads as a single coherent document.

4. The method of claim 1, wherein the request to edit the particular section or the portion of the particular section is received when the particular section or the portion of the particular section is selected on a user interface, hovered upon by a cursor or a mouse, or touched on a touch screen user interface.

5. The method of claim 1, wherein identifying the particular section or portion of the particular section to be edited based on the received request comprises visually distinguishing the particular section or portion of the particular section to be edited from other sections in the long-form content item.

6. The method of claim 5, wherein visually distinguishing includes highlighting the particular section or portion of the particular section to be edited.

7. The method of claim 1, wherein identifying the subset of relevant data from the received one or more sources comprises:

accessing raw data from at least one of the one or more sources;

indexing the raw data from the one or more sources and storing it in a semantic graph index;

generating a plurality of queries to the index, wherein the queries are generated based on analyzing the context of the identified text; and identifying the narrow set of data relevant for editing the particular section or the portion of the particular section, wherein the narrowed set of data is identified based on results of the querying.

8. The method of claim 1, further comprising:

determining a weight of each of the one or more sources that are to be used for editing the particular section or portion of the particular section; and prioritizing the highest weighted source, from the one or more sources, in editing the particular section or portion of the particular section, wherein the weight is determined based on a plurality of weighting factors.

9. The method of claim 1, further comprising:

determining, using deep learning technique, a context of the edited particular section or portion of the particular section; and determining based on the determined context whether another section or portion of the another section in the long-form content item contextually conflicts with the edited particular section or portion of the particular section.

10. The method of claim 9, further comprising, executing conflict resolution measures provided via a user interface if a determination is made that the another section in the long-form content item contextually conflicts with the edited particular section or portion of the particular section.

11. The method of claim 1, wherein the first and the second language models are a same language model.

12. The method of claim 1, further comprising:

determining a context of the particular section or the portion of the particular section to be edited;

suggesting, based on the determined context, a source authored by an employee of a same enterprise as a user requesting the editing of the particular section or the portion of the particular section; and using the source authored by the employee of the same enterprise as the user for editing the particular section or the portion of the particular section.

13. A system comprising:

communication circuitry configured to access a user device; and control circuitry configured to:

generate, using an AI orchestrator, a long-form textual content item using a first language model based on a user request received from the user device, wherein the generated long-form textual content item includes a plurality of sections organized in a hierarchical structure;

receive a request to edit a particular section or a portion of the particular section, comprising identified text from the plurality of sections, wherein the request includes a link to one or more sources that are to be used for editing the particular section or portion of the particular section;

identify the particular section or portion of the particular section to be edited based on the received request;

identify, using a second language model, a subset of relevant data from the received one or more sources, comprising:

indexing raw data from the one or more sources in a semantic graph; generating a plurality of targeted queries to the semantic graph based on analyzing the context of the identified text; and identifying a narrow set of data from the semantic graph based on results of the queries;

edit the particular section or portion of the particular section using the identified narrow set of data; and automatically synchronize unedited sections of the long-form content item by performing a coherency operation that evaluates logical and stylistic flow between the edited particular section and the unedited sections based on comparing coherency values calculated before and after the editing.

14. The system of claim 13, further comprising, the control circuitry configured to:

calculate a coherency value of all sections in a template prior to editing; compare the coherency value prior to editing with a coherency value calculated after editing the particular section; and edit the unedited section to make it coherent if a threshold percentage of coherency change is detected.

15. The system of claim 13, further comprising, the control circuitry configured to:

automatically determine that a second section in the content item has become incoherent due to editing of the particular section or portion of the particular section; and in response to determining that the second section in the content item has become incoherent due to editing of the particular section or portion of the particular section, edit the second section to make it coherent with the edited particular section or portion of the particular section.

16. The system of claim 13, wherein identifying the particular section or portion of the particular section to be edited based on the received request comprises the control circuitry configured to visually distinguish the particular section or portion of the particular section to be edited from other sections in the content item.

17. The system of claim 13, wherein identifying the subset of relevant data from the received one or more sources comprises, the control circuitry configured to:

access raw data from at least one of the one or more sources;

index the raw data from the one or more sources and storing it in a semantic graph index;

generate a plurality of queries to the index, wherein the queries are generated based on analyzing the context of the identified text; and identify the narrow set of data relevant for editing the particular section or the portion of the particular section, wherein the narrowed set of data is identified based on results of the querying.

18. The system of claim 13, further comprising, the control circuitry configured to:

determine a weight of each of the one or more sources that are to be used for editing the particular section or portion of the particular section; and prioritize the highest weighted source, from the one or more sources, in editing the particular section or portion of the particular section, wherein the weight is determined based on a plurality of weighting factors.

19. The system of claim 13, further comprising, the control circuitry configured to:

determine, using a using deep technique, a context of the edited particular section or portion of the particular section; and determine based on the determined context whether another section or portion of the another section in the content item contextually conflicts with the edited particular section or portion of the particular section.

20. The system of claim 19, further comprising, the control circuitry configured to execute conflict resolution measures if a determination is made that the another section in the content item contextually conflicts with the edited particular section or portion of the particular section.

* * * * *